(12) United States Patent
Mitsumori

(10) Patent No.: US 8,477,643 B2
(45) Date of Patent: Jul. 2, 2013

(54) COMMUNICATION APPARATUS AND METHOD FOR CONTROLLING THE COMMUNICATION APPARATUS

(75) Inventor: Yasuyuki Mitsumori, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 318 days.

(21) Appl. No.: 12/862,145

(22) Filed: Aug. 24, 2010

(65) Prior Publication Data

US 2011/0044190 A1  Feb. 24, 2011

(30) Foreign Application Priority Data

Aug. 24, 2009  (JP) ................................. 2009-192975

(51) Int. Cl.
*H04L 12/26* (2006.01)
*H04L 12/28* (2006.01)

(52) U.S. Cl.
USPC .......................................... 370/252; 370/401

(58) Field of Classification Search
USPC ................ 370/252–255, 395.31, 401, 419
See application file for complete search history.

(56) References Cited

U.S. PATENT DOCUMENTS

| 7,355,969 | B2 * | 4/2008 | Champlin et al. ............ 370/230 |
| 7,457,246 | B2 * | 11/2008 | Zhang ........................... 370/230 |
| 7,738,465 | B2 | 6/2010 | Akahane et al. |
| 7,826,458 | B2 * | 11/2010 | Rowell et al. ............ 370/395.31 |
| 8,094,552 | B1 * | 1/2012 | Sachidanandam ............ 370/230 |
| 2003/0189936 | A1 * | 10/2003 | Terrell et al. ............. 370/395.31 |
| 2010/0080235 | A1 * | 4/2010 | Yamate et al. ........... 370/395.31 |

FOREIGN PATENT DOCUMENTS

| JP | 2001-344190 A | 12/2001 |
| JP | 2005-51736 A | 2/2005 |

* cited by examiner

*Primary Examiner* — Hong Cho
(74) *Attorney, Agent, or Firm* — Fujitsu Patent Center

(57) ABSTRACT

A communication apparatus comprising a table configured to include a correspondence between at least one of a first identifier that identifies a port from which frames are received, a second identifier that identifies a port from which frames are transmitted, a third identifier that identifies a flow related to a frame received, and a fourth identifier that identifies a flow related to a frame to be transmitted, and a fifth identifier that is different from the first to fourth identifiers, a counter equipped for each fifth identifier, and a controller configured to search the table, each time a frame is received or transmitted, for a fifth identifier by using any one of the first to fourth identifiers related to the frame as a key, and increment a counter corresponding to the fifth identifier by an amount.

7 Claims, 29 Drawing Sheets

PORT#1  | PORT VALID/INVALID |
PORT#2  | PORT VALID/INVALID |
        |        ⋮           |
PORT#N  | PORT VALID/INVALID |

(TABLE INDEX = PORT NUMBER)

FIG. 7
Related Art
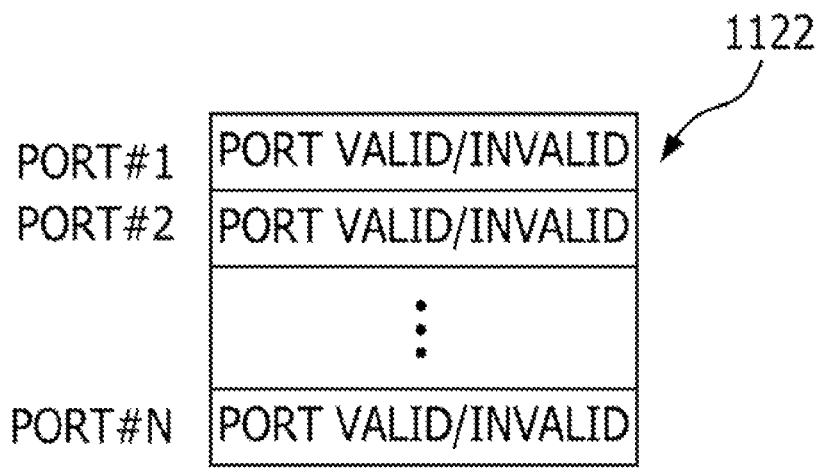
(TABLE INDEX = DESTINATION PORT NUMBER)
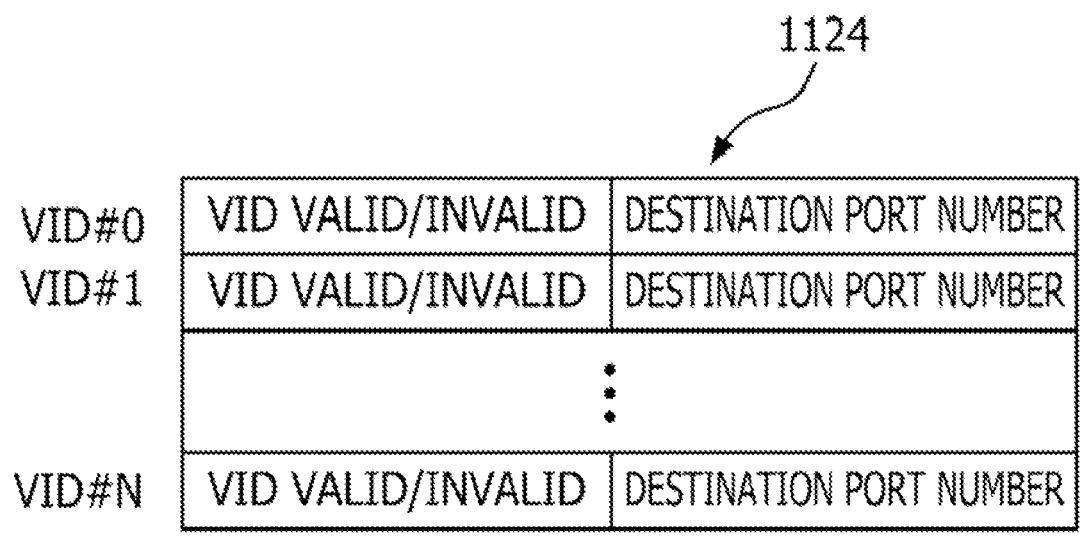
(TABLE INDEX = VID NUMBER)

FIG. 12

| VID#0 | VID VALID/INVALID | PMID |
| VID#1 | VID VALID/INVALID | PMID |
| ... | ... | ... |
| VID#N | VID VALID/INVALID | PMID |

1134

(TABLE INDEX = VID NUMBER)

FIG. 19

| | VID VALID/INVALID | DESTINATION PORT NUMBER | PMID |
|---|---|---|---|
| VID#0 | VID VALID/INVALID | DESTINATION PORT NUMBER | PMID |
| VID#1 | VID VALID/INVALID | DESTINATION PORT NUMBER | PMID |
| ... | | | |
| VID#N | VID VALID/INVALID | DESTINATION PORT NUMBER | PMID |

1144

(TABLE INDEX = VID NUMBER)

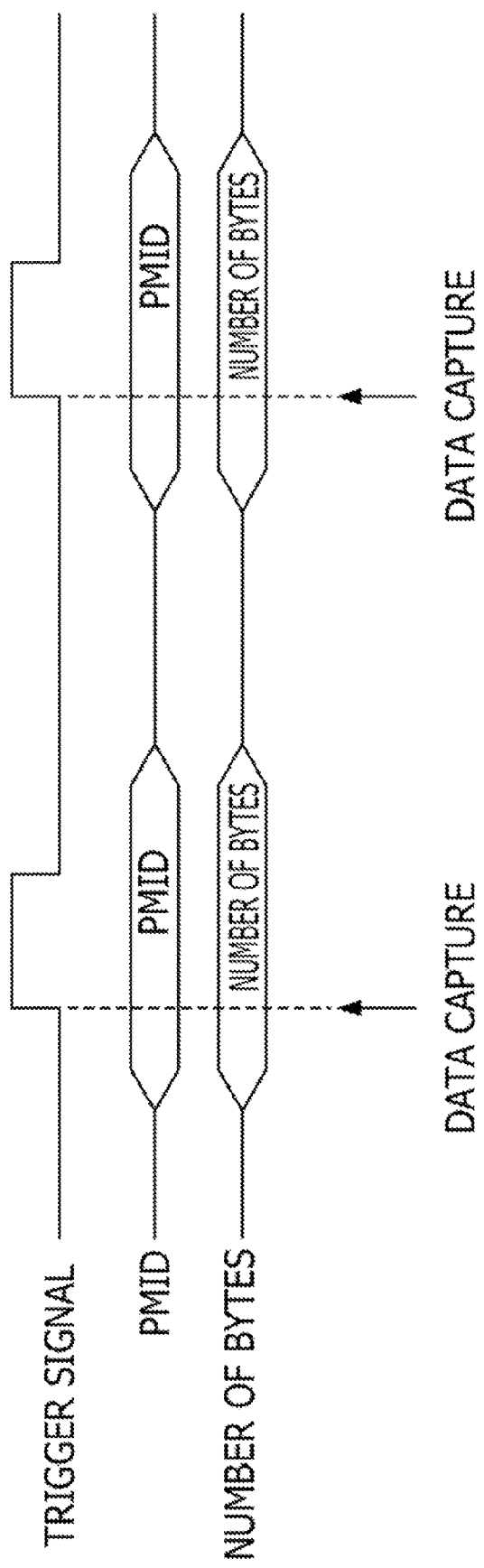

FIG. 26C

|  | NUMBER OF RECEIVED FRAMES (16 BITS) | NUMBER OF RECEIVED BYTES (48 BITS) |
|---|---|---|
| PMID#0 | NUMBER OF RECEIVED FRAMES (16 BITS) | NUMBER OF RECEIVED BYTES (48 BITS) |
| PMID#1 | NUMBER OF RECEIVED FRAMES (16 BITS) | NUMBER OF RECEIVED BYTES (48 BITS) |
| ... | ... | ... |
| PMID#N | NUMBER OF RECEIVED FRAMES (16 BITS) | NUMBER OF RECEIVED BYTES (48 BITS) |

1153

(TABLE INDEX = PMID)

COMMUNICATION APPARATUS AND METHOD FOR CONTROLLING THE COMMUNICATION APPARATUS

CROSS-REFERENCE TO RELATED APPLICATIONS

This application is based upon and claims the benefit of priority of the prior Japanese Patent Application No. 2009-192975, filed on Aug. 24, 2009, the entire contents of which are incorporated herein by reference.

FIELD

The embodiments discussed herein are related to techniques for collecting statistical information, such as the number of received frames and the number of transmitted frames, in communication apparatuses that deal with frames and packets.

BACKGROUND

In the following description, frames and packets will be considered synonymous and referred to as frames.

In general, communication apparatuses that deal with frames as transfer data (communication data) on a network are sometimes requested to independently collect statistical information. Examples of such statistical information includes the number of received frames, the number of received bytes, the number of dropped received frames, the number of transmitted frames, the number of transmitted bytes, and the number of dropped transmitted frames. Such statistical information is requested to be collected for each physical port or each logical flow.

FIG. 1 illustrates a network configuration, where there are a plurality of communication apparatuses 1 and a plurality of pieces of user terminal equipment 2. A communication apparatus 1 receives a frame transmitted from user terminal equipment 2, and transfers the frame to an appropriate destination on the basis of address information or the like stored in the frame. For example, when the user terminal equipment 2 transmits an Ethernet® frame or an Internet protocol (IP) frame, the communication apparatus 1 transfers the frame on the basis of a media access control (MAC) address stored in the Ethernet frame or an IP address stored in the IP frame.

FIG. 2 illustrates an internal block configuration of a communication apparatus 1. The communication apparatus 1 includes a plurality of line interface units 11, a switch unit 12, and an upper layer controller 13. The line interface units 11 have line ports, provide an interface function for connection to external devices, and perform processing for receiving and transmitting frames. The line interface units 11 are typically provided as removable cards, units, or modules. Hereinafter, such cards, units, and modules will be considered synonymous and referred to as cards.

The switch unit 12 transmits and receives data signals to and from the line interface units 11 within the apparatus, and provides a switching function for transfer of frames between the line interface units 11. The switch unit 12 is typically provided as a removable card. The upper layer controller 13 transmits and receives control signals to and from the line interface units 11 and the switch unit 12 within the apparatus, and controls the entire apparatus. The upper layer controller 13 controls, for example, various settings of each part of the apparatus, alarms, and statistical information. The upper layer controller 13 connects to maintenance management equipment 3, such as an external monitor, and other external devices to transmit and receive control and management data to and from them. The upper layer controller 13 is typically provided as a removable card. The line interface units 11, the switch unit 12, and the upper layer controller 13 may not be removable and may be integral with a motherboard (or a mother card) of the apparatus.

FIG. 3 illustrates a configuration for a receiving process of a line interface unit 11 in a related communication apparatus 1. Although the line interface unit 11 generally includes configurations for both receiving and transmitting processes, FIG. 3 illustrates only a configuration for a receiving process, for convenience of explanation. A configuration for a transmitting process will be described later on. Although an apparatus that transmits and receives Ethernet® frames is described as an example, the apparatus may be one that transmits and receives IP frames or asynchronous transfer mode (ATM) packets.

Referring to FIG. 3, the line interface unit 11 includes a receiving port controller 1111, a receiving port management table 1112, a received flow controller 1113, and a received flow management table 1114. The line interface unit 11 also includes a counter controller 1115 for receiving ports, a received frame counter 1116 equipped for each port, a counter controller 1117 for received flows, and a received frame counter 1118 equipped for each flow. The line interface unit 11 also includes a controller 1101 and a working memory 1102.

The receiving port controller 1111 controls received frames for each physical port. The receiving port controller 1111 typically has a termination function for each of a physical (PHY) layer and a MAC layer. When a frame is received from each port, the receiving port controller 1111 uses a receiving port number as an index (or key) to retrieve the corresponding information from the receiving port management table 1112. The receiving port controller 1111 then determines whether the receiving port is set as a valid port.

FIG. 4A illustrates a data structure of the receiving port management table 1112. As control information for each port, the receiving port management table 1112 stores "port valid/invalid" that indicates whether the port is valid. If the port is set as an invalid port, a received frame from this port is dropped.

Referring back to FIG. 3, when a frame is received on a valid port, the receiving port controller 1111 transmits to the counter controller 1115 a trigger signal and the receiving port number for incrementing the received frame counter 1116 corresponding to the port number by one. Also, the receiving port controller 1111 multiplexes received frames received from respective valid receiving ports and transmits the frames to the received flow controller 1113 downstream of the receiving port controller 1111. For example, when the port speed is 1 Gbps and the number of ports is 10, the receiving port controller 1111 multiplexes received frames and transmits them to the received flow controller 1113 at a speed of 10 Gbps. A notification of a trigger signal and a receiving port number to the counter controller 1115 is serially transferred in synchronization with frame multiplexing.

The counter controller 1115 controls access to the received frame counter 1116. Upon receipt of the trigger signal from the receiving port controller 1111, the counter controller 1115 reads from the received frame counter 1116 a value corresponding to the receiving port number that is received together with the trigger signal, adds one to the read value, and writes the resulting value to the received frame counter 1116. Thus, a counter segment corresponding to the receiving port number is incremented by one. The counter controller 1115 resolves a conflict between the receiving port controller 1111 and the controller 1101 over access to the received frame counter 1116. This can be realized by a timing process in which, when accesses from the receiving port controller 1111 and the controller 1101 are accepted at the same time, a response to the access from the controller 1101 is delayed and a higher priority is given to processing performed by the receiving port controller 1111.

The received flow controller 1113 performs flow-by-flow control for each virtual local area network (VLAN) ID or VID of a received frame.

FIG. 5 illustrates an Ethernet frame format with a VLAN tag. As illustrated, a VID (or VLAN ID) is stored in the VLAN tag.

Referring back to FIG. 3, when each frame is received, the received flow controller 1113 uses a VID as an index (or key) to retrieve the corresponding information from the received flow management table 1114. The received flow controller 1113 then determines whether the received VID is set as a valid VID.

FIG. 4B illustrates a data structure of the received flow management table 1114. As control information for each VID, the received flow management table 1114 stores "VID valid/invalid" that indicates whether the VID is valid. A received frame having an invalid VID is dropped.

Referring back to FIG. 3, when a frame having a valid VID is received, the received flow controller 1113 transmits to the counter controller 1117 a trigger signal and the received VID for incrementing the received frame counter 1118 by one. Also, the received flow controller 1113 transmits frames each having a valid VID to the switch unit 12 downstream of the received flow controller 1113.

The counter controller 1117 controls access to the received frame counter 1118. Upon receipt of the trigger signal from the received flow controller 1113, the counter controller 1117 reads from the received frame counter 1118 a value corresponding to the VID that is received together with the trigger signal, adds one to the read value, and writes the resulting value to the received frame counter 1118. Thus, a counter segment corresponding to the received VID is incremented by one. The counter controller 1117 resolves a conflict between the received flow controller 1113 and the controller 1101 over access to the received frame counter 1118. This can be realized by a timing process in which, when accesses from the received flow controller 1113 and the controller 1101 are accepted at the same time, a response to the access from the controller 1101 is delayed and a higher priority is given to processing performed by the received flow controller 1113.

The controller 1101 is a component which includes a central processing unit (CPU). Through a control bus within the line interface unit 11, the controller 1101 performs setting and control for each part of the line interface unit 11, and collects statistical information from each counter. Also, through a control bus within the apparatus, the controller 1101 transmits and receives control data and management data to and from the upper layer controller 13.

The working memory 1102 is a memory that the controller 1101 uses to perform processing by software (or program).

FIG. 6 illustrates a configuration for a transmitting process of a line interface unit 11 in the related communication apparatus 1.

Referring to FIG. 6, the line interface unit 11 includes a transmitting port controller 1121, a transmitting port management table 1122, a transmitted flow controller 1123, and a transmitted flow management table 1124. The line interface unit 11 also includes a counter controller 1125 for transmitting ports, a transmitted frame counter 1126 equipped for each port, a counter controller 1127 for transmitted flows, and a transmitted frame counter 1128 equipped for each flow. The controller 1101 and the working memory 1102 are common to those for the receiving process described above.

FIG. 7 illustrates data structures of the transmitting port management table 1122 and the transmitted flow management table 1124. Like the receiving port management table 1112 illustrated in FIG. 4A, as control information for each port, the transmitting port management table 1122 stores "port valid/invalid" that indicates whether the port is valid. The transmitted flow management table 1124 stores "destination port number" in addition to "VID valid/invalid" stored in the received flow management table 1114 illustrated in FIG. 4B.

Referring to FIG. 6, in a transmitting control operation of the line interface unit 11, the transmitted flow controller 1123 receives a frame received through the switch unit 12, determines a VID value in the received frame, and uses the VID value as an index (or key) to search the transmitted flow management table 1124.

If the VID is invalid, the transmitted flow controller 1123 drops the received frame. If the VID is valid, the transmitted flow controller 1123 transmits the received frame, together with a destination port number retrieved from the transmitted flow management table 1124, to the transmitting port controller 1121 downstream of the transmitted flow controller 1123. Also, the transmitted flow controller 1123 transmits a trigger signal and the VID value to the counter controller 1127. Upon receipt of the trigger signal, the counter controller 1127 increments a counter value of the transmitted frame counter 1128 corresponding to the VID by one.

Upon receipt of the frame and the destination port number, the transmitting port controller 1121 uses the received destination port number as an index (or key) to search the transmitting port management table 1122.

If the port found is invalid, the transmitting port controller 1121 drops the received frame. If the port found is valid, the transmitting port controller 1121 transmits the frame from the port to the outside. At the same time, the transmitting port controller 1121 transmits a trigger signal and the destination port number to the counter controller 1125. Upon receipt of the trigger signal, the counter controller 1125 increments a counter value of the transmitted frame counter 1126 corresponding to the destination port number by one.

Examples of known techniques are disclosed in Japanese Laid-open Patent Publication No. 2005-51736 and Japanese Laid-open Patent Publication No. 2001-344190.

SUMMARY

According to an aspect of the invention, a communication apparatus comprising: a table configured to include a correspondence between at least one of a first identifier that identifies a port from which frames are received, a second identifier that identifies a port from which frames are transmitted, a third identifier that identifies a flow related to a frame received, and a fourth identifier that identifies a flow related to a frame to be transmitted, and a fifth identifier that is different from the first to fourth identifiers, a counter equipped for each fifth identifier, and a controller configured to search the table, each time a frame is received or transmitted, for a fifth identifier by using any one of the first to fourth identifiers related to the frame as a key, and increment a counter corresponding to the fifth identifier by an amount.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A illustrates a data structure of a receiving port management table.

FIG. 7 illustrates data structures of a transmitting port management table and a transmitted flow management table.

FIG. 12 illustrates a data structure of a received flow management table according to the third embodiment.

FIG. 19 illustrates a data structure of a transmitted flow management table according to the eighth embodiment.

FIG. 26A is a timing diagram according to an embodiment, FIG. 26C illustrates a configuration of a received frame and received byte counter according to an embodiment.

DESCRIPTION OF EMBODIMENTS

In the following description, frames and packets will be considered synonymous and referred to as frames.

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present.

Figure 3:
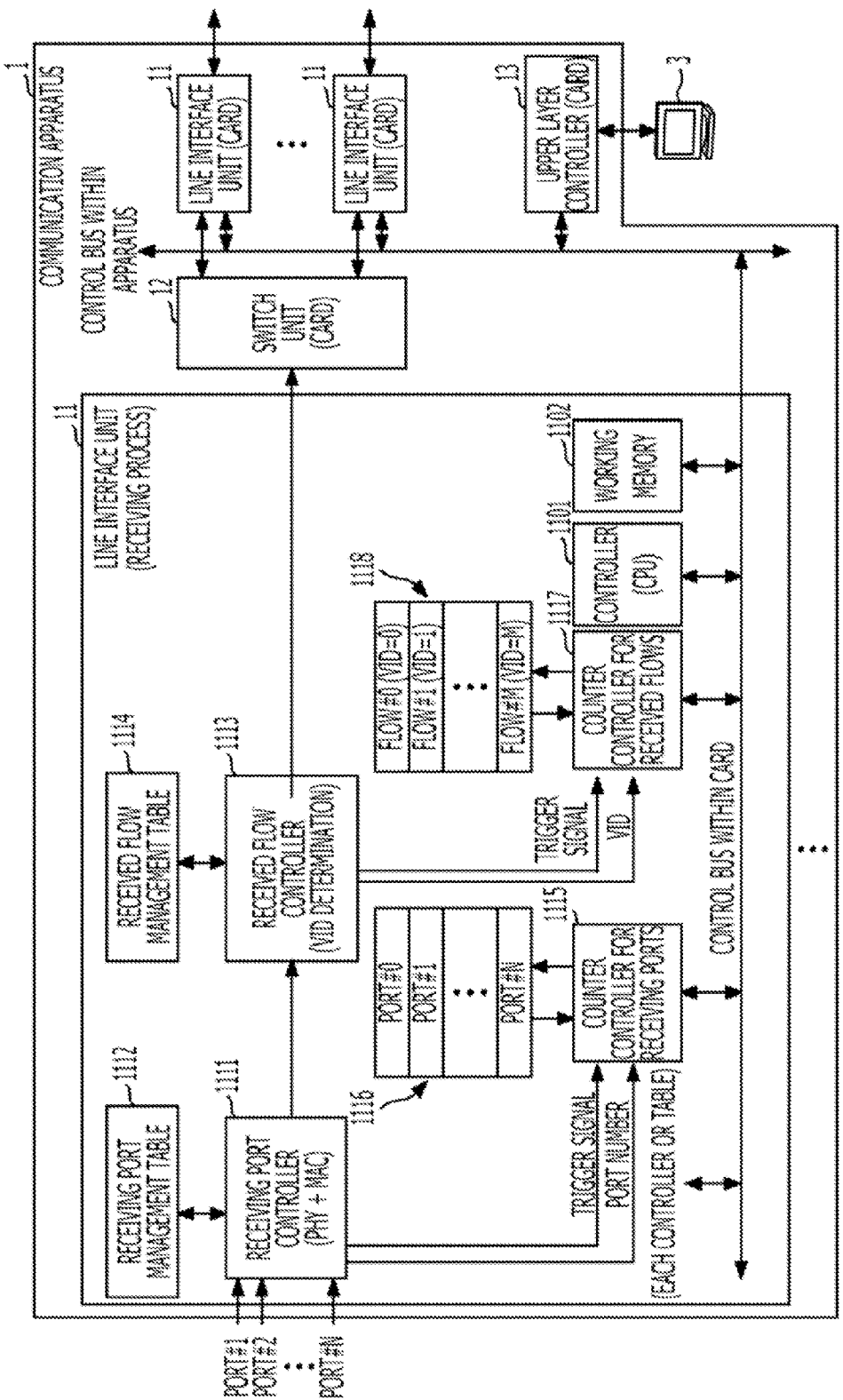
FIG. 3 illustrates a configuration for a receiving process of a line interface unit in a related communication apparatus.
Figure 6:
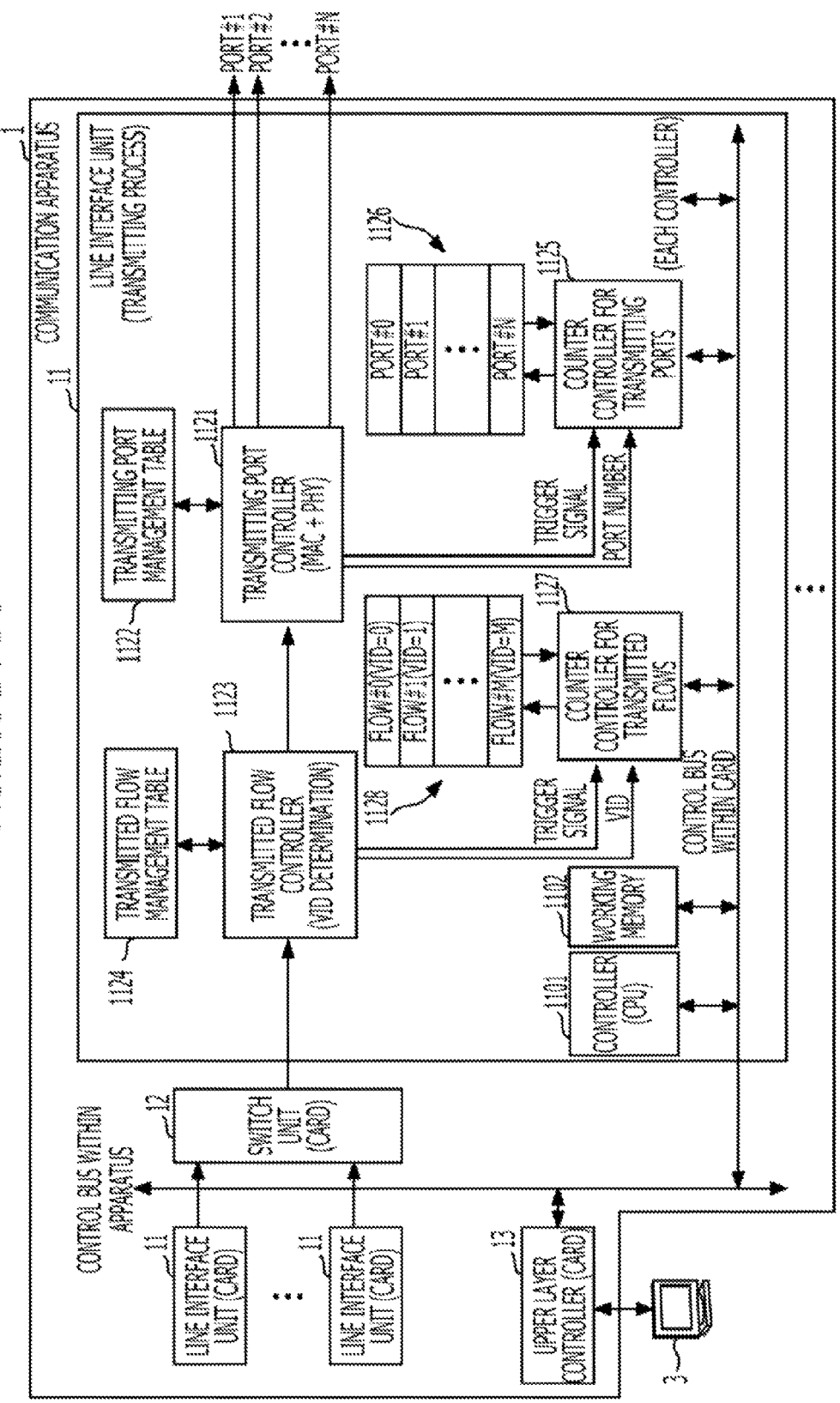
FIG. 6 illustrates a configuration for a transmitting process of a line interface unit in the related communication apparatus.

In the related communication apparatus, as illustrated in FIG. 3 and FIG. 6, statistical information, such as the number of received frames and the number of transmitted frames, is collected for each physical port or for each logical flow. However, problems arise when statistical information is collected for physical ports or logical flows that have been aggregated.

First, problems arise when such a configuration as a link aggregation (LAG) which combines a plurality of physical ports into one virtual port is created. When it is necessary to collect statistical information, such as the number of received frames, for each LAG which combines a plurality of ports, the processing load of the CPU of the controller 1101 increases and the memory area of the working memory 1102 is consumed.

That is, referring to FIG. 3, the controller 1101 is required to add statistical information for all physical ports belonging to the LAG and store the result in the working memory 1102. For example, assume that eight ports, e.g., port #1 to port #8, are aggregated into one LAG. In this case, the controller 1101 collects statistical information for port #1 to port #8 from the received frame counter 1116, adds the eight pieces of statistical information, and stores the resulting statistical information in the working memory 1102 as statistical information for one LAG unit. Additionally, as necessary or regularly, the controller 1101 transfers statistical information to the upper layer controller 13 and the maintenance management equipment 3. In this case, adding all pieces of statistical information increases the processing load of the CPU of the controller 1101. Moreover, storing statistical information for each LAG consumes the memory area of the working memory 1102.

If a plurality of LAGs are created within a card, the processing load of the CPU of the controller 1101 further increases. For example, assume that when the line interface unit 11 has 32 physical ports, 16 two-port LAGs are created or a plurality of LAGs are created from any of the ports. In such a case, the controller 1101 is required to calculate statistical information, for all combinations of the ports and the LAGs. This increases processing load of the CPU of the controller 1101.

Second, a similar problem arises when a plurality of logical flows are aggregated into different logical flows (aggregate flows) and it is necessary to collect statistical information, such as the number of received frames, for each of the aggregate flows. In this case, it is necessary to collect and add statistical information in the received frame counter 1118 illustrated in FIG. 3.

Although the case of the receiving process illustrated in FIG. 3 has been described, similar problems arise in the case of the transmitting process illustrated in FIG. 6. That is, referring to FIG. 6, when there is a request to collect statistical information for each aggregate port which combines a plurality of ports or for each aggregate flow which combines a plurality of flows, the controller 1101 needs to read statistical information for each port or flow, add all the read statistical information, and write the resulting statistical information to the working memory 1102. As a result, the processing load of the CPU of the controller 1101 increases and the memory area of the working memory 1102 is consumed.

Example embodiments will now be described.

Figure 1:
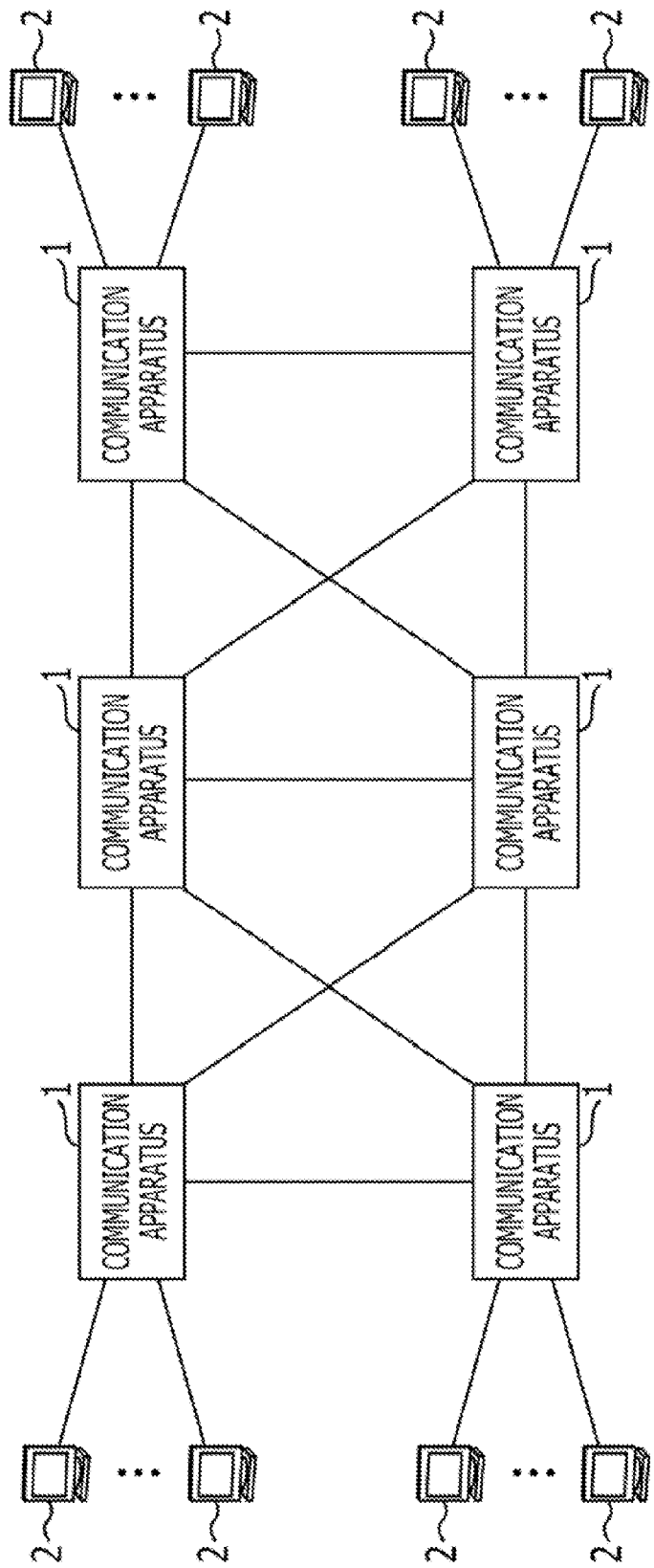
FIG. 1 illustrates a network configuration.
Figure 2:
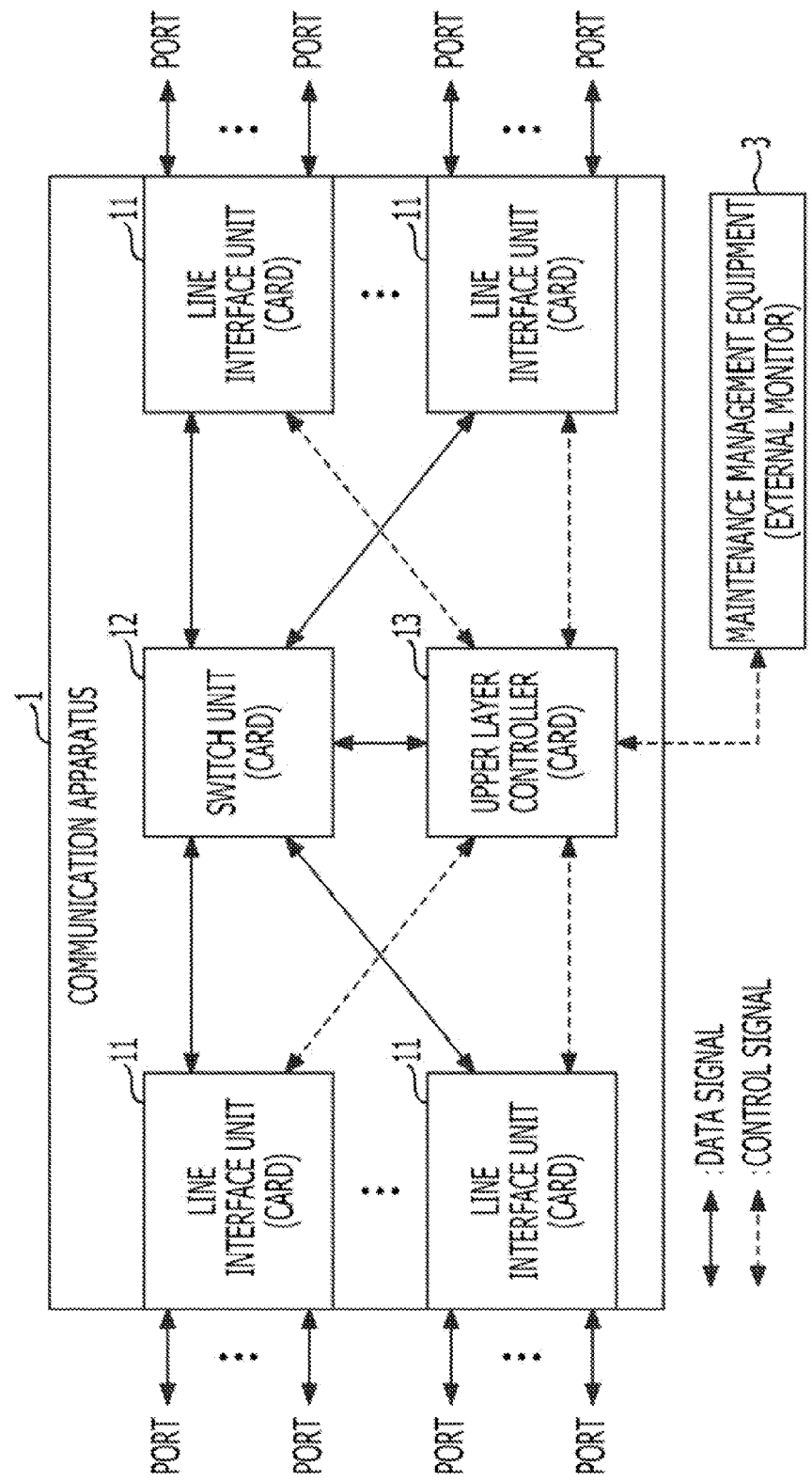
FIG. 2 illustrates an internal block configuration of a communication apparatus.

Note that in the embodiments described below, the entire network configuration is similar as that illustrated in FIG. 1, and the internal block configuration of a communication apparatus 1 is similar as that illustrated in FIG. 2.

First Embodiment

Figure 8:
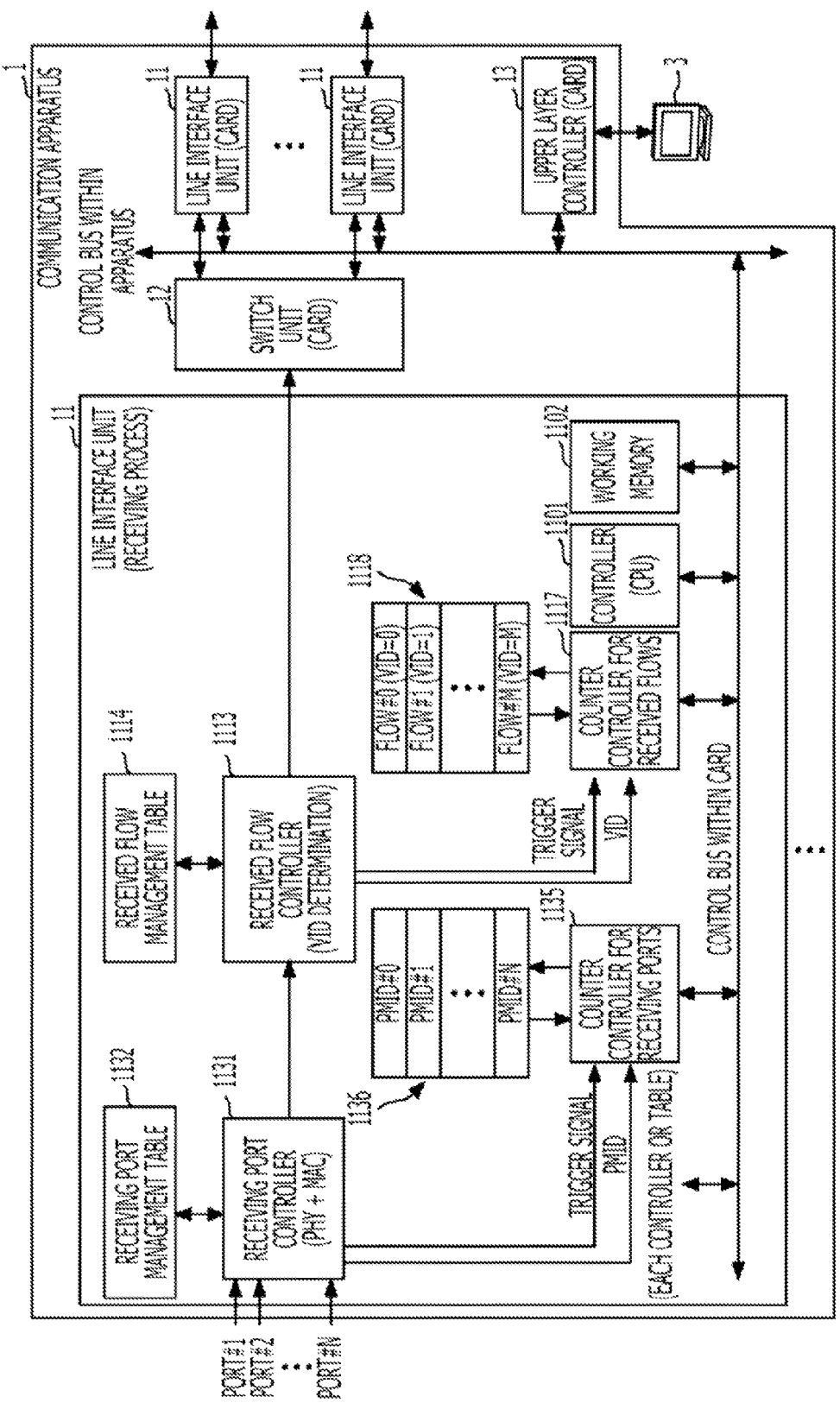
FIG. 8 illustrates a configuration for a receiving process of a line interface unit in a communication apparatus according to first and second embodiments.

FIG. 8 illustrates a configuration for a receiving process of a line interface unit 11 in a communication apparatus 1 according to first and second embodiments.

The line interface unit 11 illustrated in FIG. 8 has a similar configuration as that of the related line interface unit 11 illustrated in FIG. 3 except that the receiving port controller 1111, the receiving port management table 1112, the counter controller 1115, and the received frame counter 1116 are replaced with a receiving port controller 1131, a receiving port management table 1132, a counter controller 1135 for receiving ports, and a received frame counter 1136 equipped for each performance monitoring identifier (PMID), respectively. Note that the PMID is an identifier for collecting statistical information.

Figure 4B:
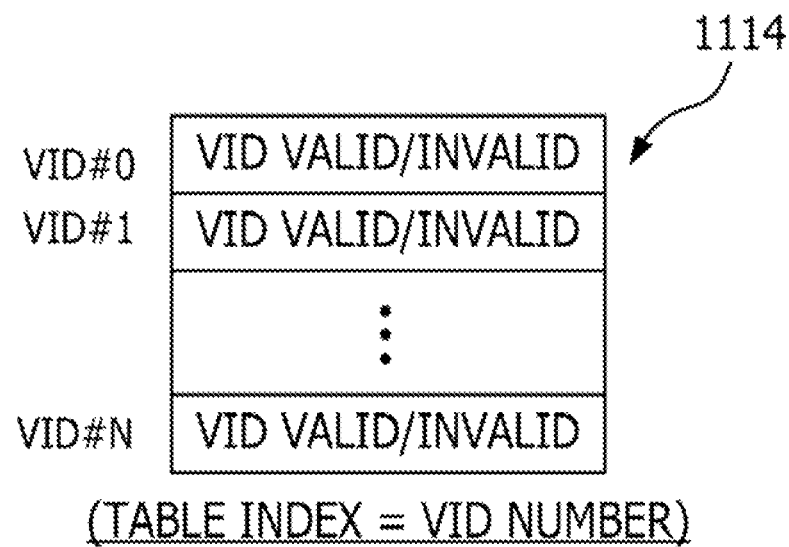
FIG. 4B illustrates a data structure of a received flow management table.
Figure 9:
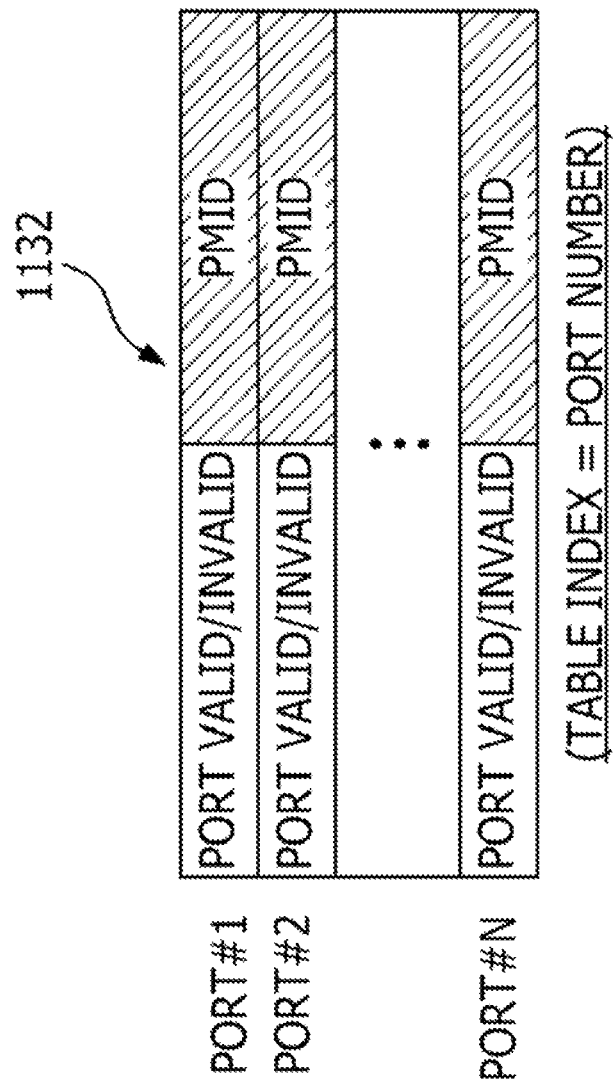
FIG. 9 illustrates a data structure of a receiving port management table according to the first embodiment.

FIG. 9 illustrates a data structure of the receiving port management table 1132 according to the first embodiment. Unlike the related receiving port management table 1112 illustrated in FIG. 4A, a field for setting a PMID for each port is provided in the receiving port management table 1132.

Operations will now be described with reference back to FIG. 8. When a frame is received, the receiving port controller 1131 uses a receiving port number as an index (or key) to refer to the receiving port management table 1132, where PMIDs are set. The receiving port controller 1131 determines whether the corresponding port is valid. If the port is valid, the receiving port controller 1131 transmits to the counter controller 1135 a trigger signal and the corresponding PMID for incrementing a value of the received frame counter 1136 for the corresponding PMID by one. Here, a trigger signal is a pulse signal which is usually a low-level (L-level) signal and temporarily becomes a high-level (H-level) signal when a PMID is transmitted. The receiving port controller 1131 determines the PMID around the rising edge from the L level to the H level, and transmits the PMID to the counter controller 1135. The counter controller 1135 captures the PMID signal on the rising edge of the trigger signal, and uses the detection of the rising edge of the trigger signal as a trigger to control the addition of one to the counter.

The counter controller 1135 controls access to the received frame counter 1136. Upon receipt of the trigger signal from the receiving port controller 1131, the counter controller 1135 reads from the received frame counter 1136 a value corresponding to the PMID that is received together with the trigger signal, adds one to the read value, and writes the resulting value to the received frame counter 1136. Thus, a counter segment corresponding to the PMID is incremented by one. For example, when a four-port LAG that combines port #1 to port #4 is created, the same PMID value, such as PMID=1, is set in PMID fields corresponding to port #1 to port #4 in the receiving port controller 1131. Thus, in the received frame counter 1136, received frames received from port #1 to port #4, which are aggregated into the same LAG, are recorded in a counter segment having the same PMID=1 as an index. The other operations are similar as those described with reference to FIG. 3.

As described above, a PMID for collecting statistical information can be set for each port. Therefore, collection of statistical information for each aggregate port which combines a plurality of ports can be accomplished by hardware. It is thus possible to reduce the processing load of the CPU of the controller 1101 and reduce the use of the working memory 1102. In the example of the LAG described above, the controller 1101 does not have to calculate the total number of received frames for port #1 to port #4. Instead, the number of received frames can be collected for each LAG by reading a counter value corresponding to PMID=1 in the received frame counter 1136.

Second Embodiment

Figure 10:
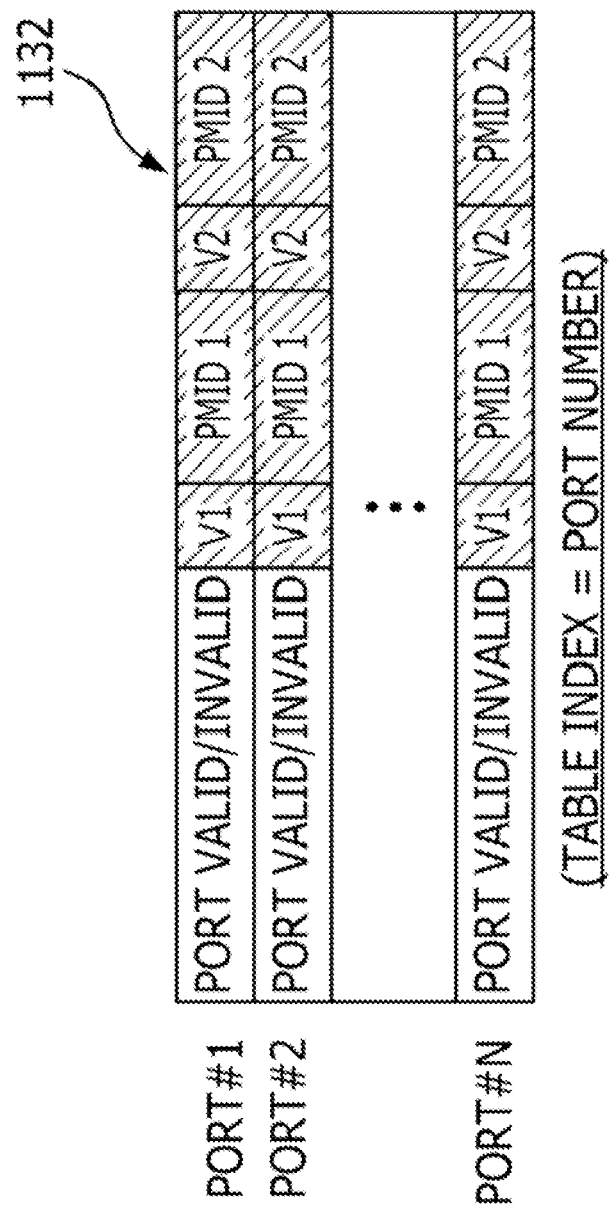
FIG. 10 illustrates a data structure of the receiving port management table according to the second embodiment.

FIG. 10 illustrates a data structure of the receiving port management table 1132 according to the second embodiment. The apparatus configuration is the same as that illustrated in FIG. 8.

Referring to FIG. 10, to allow two PMIDs to be set for each physical port, the receiving port management table 1132 has two valid bit (V bit) fields and two PMID fields for each port. To allow two or more PMIDs to be set, two or more V bit fields and PMID fields may be provided.

V1 is a V bit for PMID1 and indicates whether PMID1 is valid or not. Specifically, V1=0 indicates that PMID1 is invalid, while V1=1 indicates that PMID1 is valid. Similarly, V2 is a V bit for PMID2 and indicates whether PMID2 is valid or not. Specifically, V2=0 indicates that PMID2 is invalid, while V2=1 indicates that PMID2 is valid.

Referring to FIG. 8, when a V bit is valid, the counter controller 1135 increments the received frame counter 1136 by one on the basis of the corresponding PMID. For example, when both V1 and V2 are valid, the counter controller 1135 receives PMID1 and PMID2, along with receiving a trigger signal twice, from the receiving port controller 1131. Then, on the basis of the received PMID1 and PMID2, the counter controller 1135 accesses the received frame counter 1136 twice to increment each of counter values corresponding to the respective PMID1 and PMID2 by one. The other operations are similar as those described in the first embodiment.

Although V bits are implemented here, it is possible, without using V bits, that a value indicating that a PMID is invalid (e.g., PMID=0) be determined in advance, so as to prevent an invalid PMID from being accessed. In this case, a counter value for PMID=0 in the received frame counter 1136 is a meaningless counter entry that counts the number of invalid received frames for which collection of statistical information is not necessary.

As described above, two or more PMIDs can be set for one physical port. Therefore, when, for example, LAGs are created, it is possible to accommodate a request to collect statistical information for each physical port separately from statistical information for each LAG. When hardware supports collection of statistical information for each port and that for each aggregate port at the same time, it is possible to reduce the CPU load of processing and managing statistical information. Moreover, with implementation of V bits, when it is not necessary to collect statistical information even though ports are operating, it is possible to stop collecting the statistical information. This can reduce unnecessary power consumption of the hardware.

Third Embodiment

Figure 11:
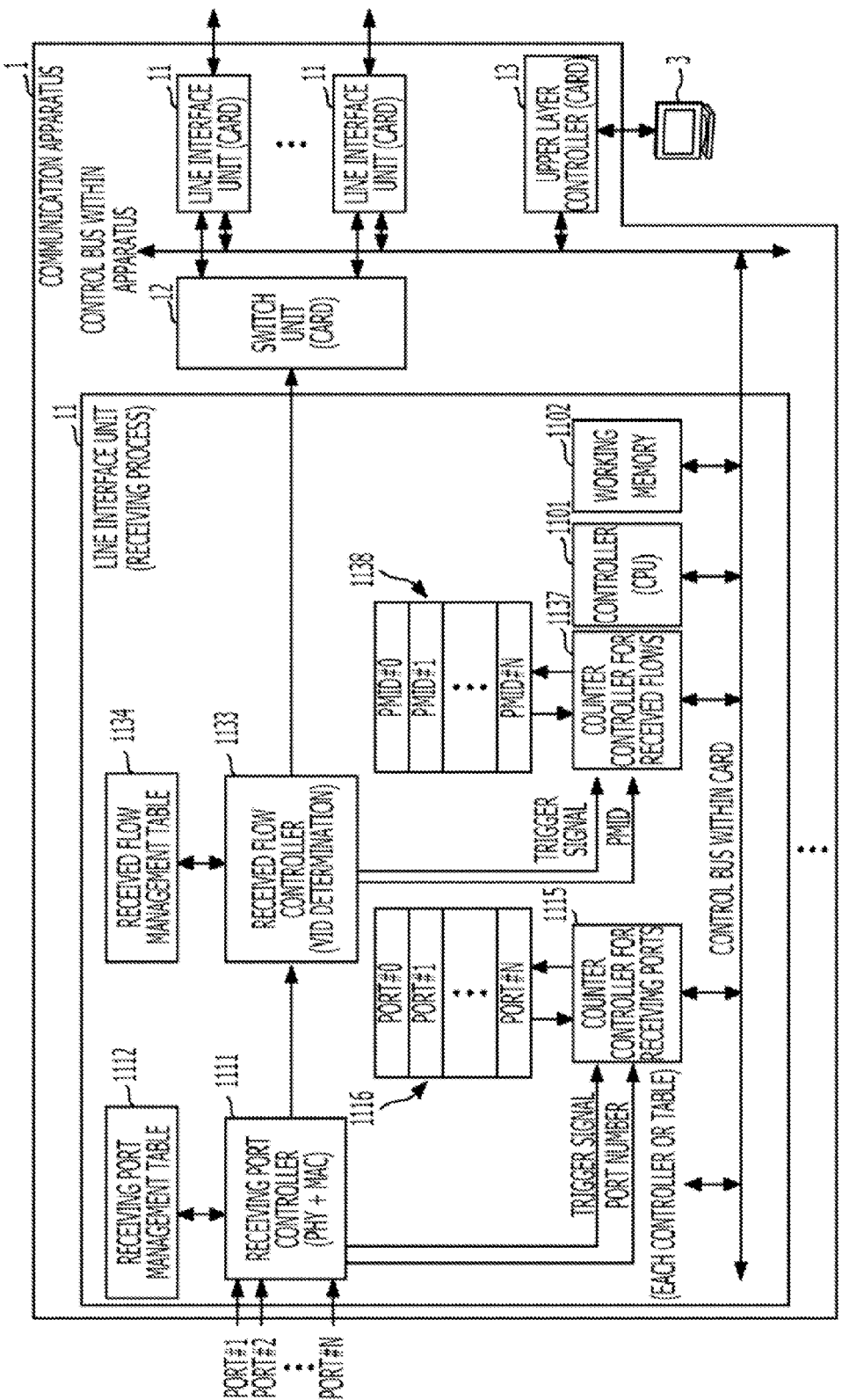
FIG. 11 illustrates a configuration for a receiving process of a line interface unit in the communication apparatus according to third and fourth embodiments.

FIG. 11 illustrates a configuration for a receiving process of a line interface unit 11 in a communication apparatus 1 according to third and fourth embodiments.

The line interface unit 11 illustrated in FIG. 11 has a similar configuration as that of the related line interface unit 11 illustrated in FIG. 3 except that the received flow controller 1113, the received flow management table 1114, the counter controller 1117, and the received frame counter 1118 are replaced with a received flow controller 1133, a received flow management table 1134, a counter controller 1137 for received flows, and a received frame counter 1138 equipped for each PMID, respectively.

FIG. 12 illustrates a data structure of the received flow management table 1134 according to the third embodiment. Unlike the related received flow management table 1114 illustrated in FIG. 4B, a field for setting a PMID for each VID is provided in the received flow management table 1134. That is, a PMID can be set for each flow or logical channel. Here, the term flow or logical channel does not refer to physical ports, such as fibers or cables, but refers to logical frames transferred through physical ports. The term flow or logical channel further refers to units identified or divided on the basis of identifiers, such as IDs, addresses, or channel numbers, contained in the logical frames.

Operations will now be described with reference back to FIG. 11. When a frame is received, the received flow controller 1133 uses a VID as an index (or key) to refer to the received flow management table 1134, where PMIDs are set. The received flow controller 1133 determines whether the corresponding VID is valid. If the VID is valid, the received flow controller 1133 transmits to the counter controller 1137 a trigger signal and the corresponding PMID for incrementing a value of the received frame counter 1138 for the corresponding PMID by one.

The counter controller 1137 controls access to the received frame counter 1138. Upon receipt of the trigger signal from the received flow controller 1133, the counter controller 1137 reads from the received frame counter 1138 a value corresponding to the PMID that is received together with the trigger signal, adds one to the read value, and writes the resulting value to the received frame counter 1138. Thus, a counter segment corresponding to the PMID is incremented by one. The other operations are similar as those described with reference to FIG. 3.

As described above, a PMID for collecting statistical information can be set for each flow. Therefore, collection of statistical information for each aggregate flow which combines a plurality of flows can be accomplished by hardware. For example, in a network service configuration where a plurality of different VID frames are aggregated into one service flow, the different VID frames can be aggregated into one piece of statistical information. It is thus possible to reduce the load of the CPU of the controller 1101 and reduce the use of the working memory 1102.

Fourth Embodiment

Figure 13:
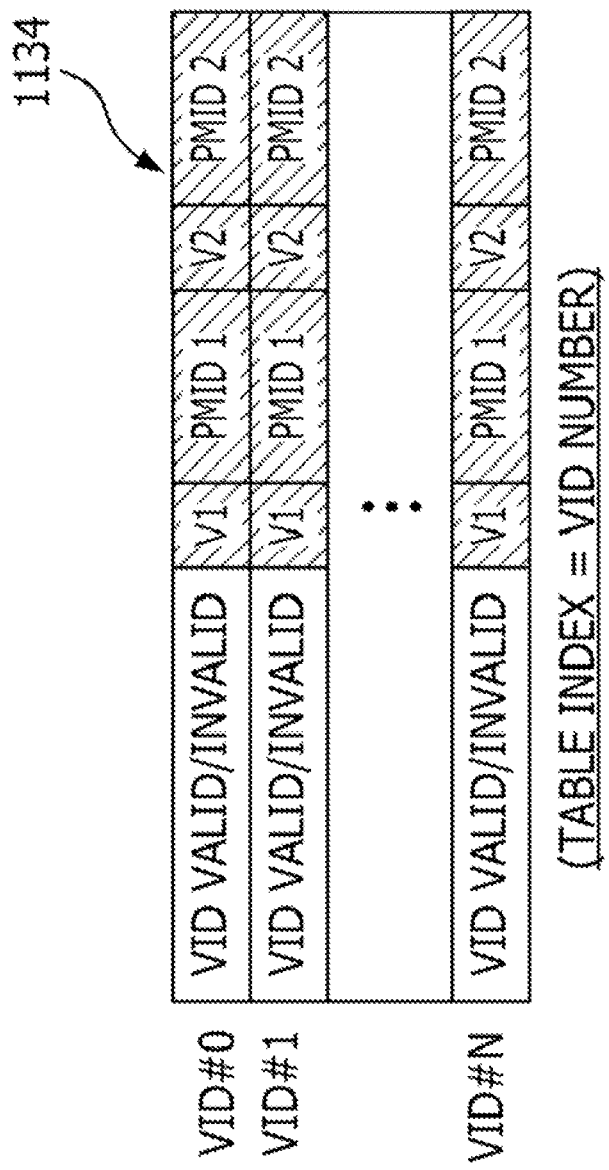
FIG. 13 illustrates a data structure of the received flow management table according to the fourth embodiment.

FIG. 13 illustrates a data structure of the received flow management table 1134 according to the fourth embodiment. The apparatus configuration is similar as that illustrated in FIG. 11.

Referring to FIG. 13, to allow two PMIDs to be set for each flow or logical channel, the received flow management table 1134 has two V bit fields and two PMID fields for each VID. To allow two or more PMIDs to be set, two or more V bit fields and PMID fields may be provided.

V1 is a V bit for PMID1 and indicates whether PMID1 is valid or not. Specifically, V1=0 indicates that PMID1 is invalid, while V1=1 indicates that PMID1 is valid. Similarly, V2 is a V bit for PMID2 and indicates whether PMID2 is valid or not. Specifically, V2=0 indicates that PMID2 is invalid, while V2=1 indicates that PMID2 is valid.

Referring to FIG. 11, when a V bit is valid, the counter controller 1137 increments the received frame counter 1138 by one on the basis of the corresponding PMID. For example, when both V1 and V2 are valid, the counter controller 1137 receives PMID1 and PMID2, along with receiving a trigger signal twice, from the received flow controller 1133. Then, on the basis of the received PMID1 and PMID2, the counter controller 1137 accesses the received frame counter 1138 twice to increment each of counter values corresponding to the respective PMID1 and PMID2 by one. The other operations are the same as those described in the third embodiment.

As described above, two or more PMIDs can be set for each VID. Therefore, collection of statistical information for each flow and that for each aggregate flow which combines a plurality of flows can be simultaneously done by hardware. This can reduce the load of the CPU of the controller 1101.

Fifth Embodiment

Figure 14:
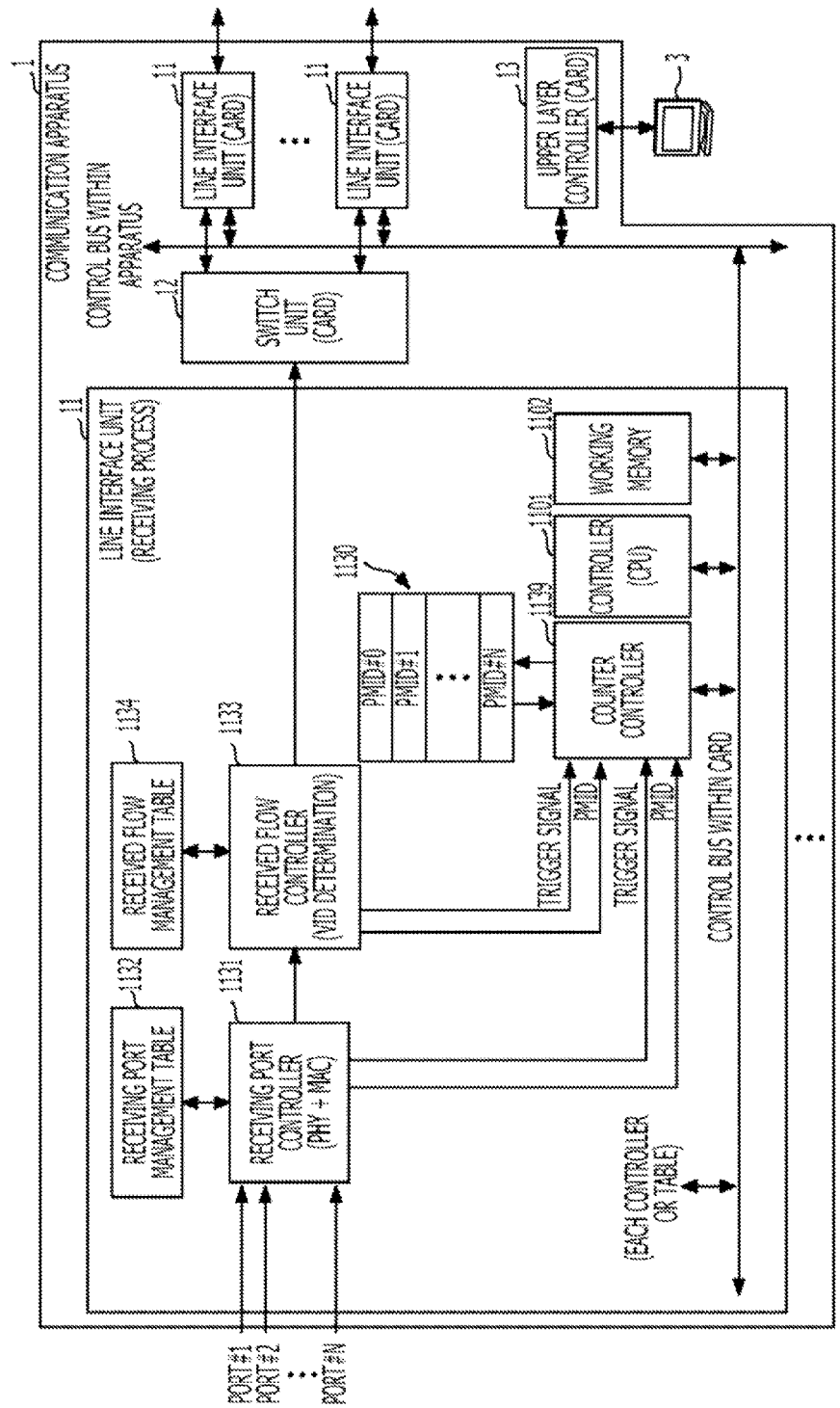
FIG. 14 illustrates a configuration for a receiving process of a line interface unit in the communication apparatus according to a fifth embodiment.

FIG. 14 illustrates a configuration for a receiving process of a line interface unit 11 in the communication apparatus 1 according to a fifth embodiment.

The line interface unit 11 illustrated in FIG. 14 has a similar configuration as that of the related line interface unit 11 illustrated in FIG. 3 except that the line interface unit 11 illustrated in FIG. 14 includes the receiving port controller 1131, the receiving port management table 1132, the received flow controller 1133, and the received flow management table 1134 instead of the receiving port controller 1111, the receiving port management table 1112, the received flow controller 1113, and the received flow management table 1114, respectively. Also, instead of the counter controller 1115, the received frame counter 1116, the counter controller 1117, and the received frame counter 1118 of the related line interface unit 11 illustrated in FIG. 3, the line interface unit 11 illustrated in FIG. 14 includes a counter controller 1139 common to both the receiving port controller 1131 and the received flow controller 1133, and a received frame counter 1130 equipped for each PMID.

The line interface unit 11 illustrated in FIG. 14 includes the receiving port management table 1132 illustrated in FIG. 10 and the received flow management table 1134 illustrated in FIG. 13. Alternatively, the line interface unit 11 illustrated in FIG. 14 may include the receiving port management table 1132 illustrated in FIG. 9 and the received flow management table 1134 illustrated in FIG. 12.

Referring to FIG. 14, the counter controller 1139 receives a trigger signal and a PMID from each of the receiving port controller 1131 and the received flow controller 1133, resolves a conflict between the receiving port controller 1131 and the received flow controller 1133, and increments a value of the received frame counter 1130 corresponding to the received PMID by one.

It is thus possible to collect statistical information on a PMID-by-PMID basis for both ports and flows, support collection of statistical information on both individual and aggregate bases, and reduce the CPU load of collecting and managing statistical information in the controller 1101.

Sixth Embodiment

Figure 15:
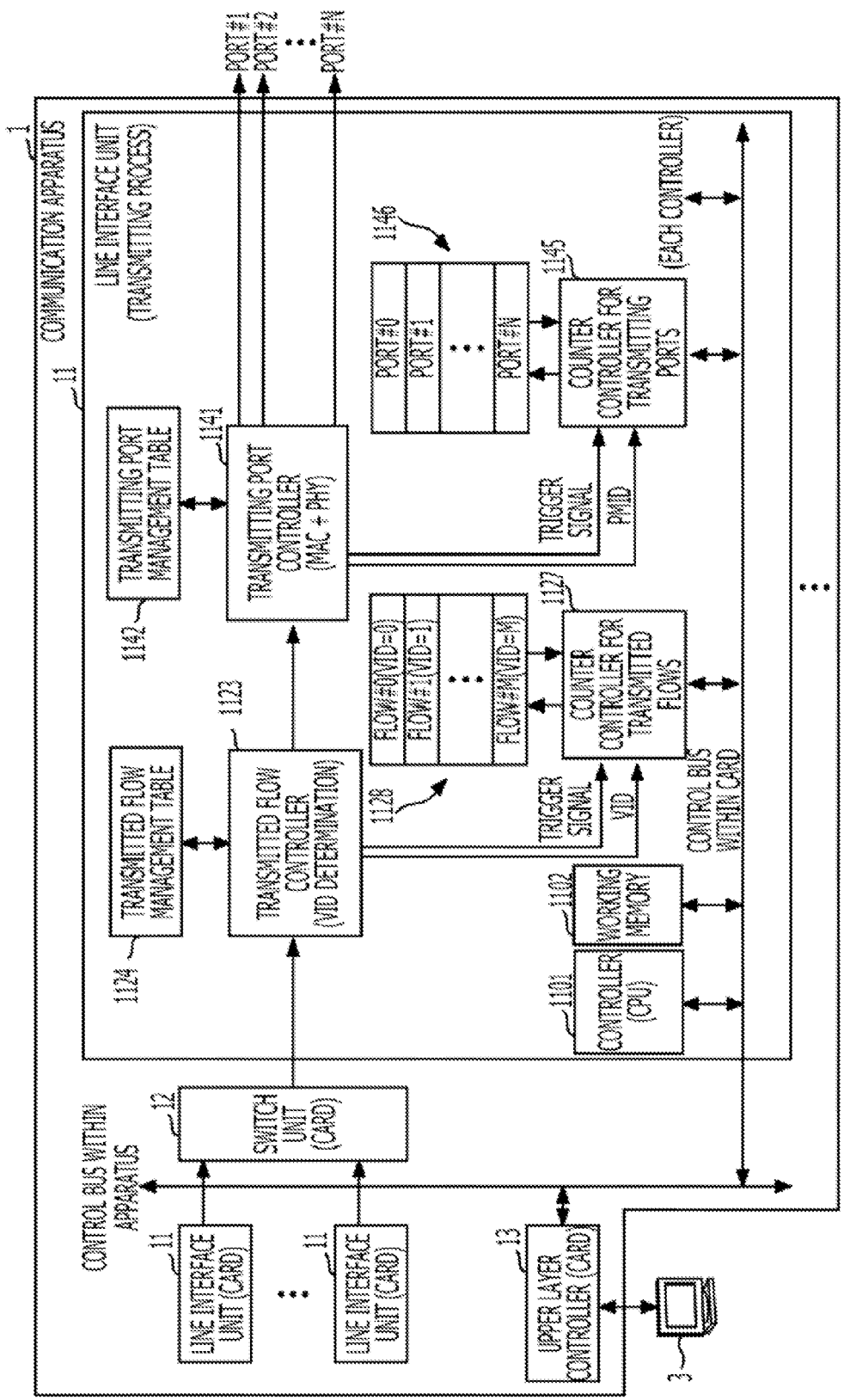
FIG. 15 illustrates a configuration for a transmitting process of a line interface unit in the communication apparatus according to sixth and seventh embodiments.

FIG. 15 illustrates a configuration for a transmitting process of a line interface unit 11 in the communication apparatus 1 according to sixth and seventh embodiments.

The line interface unit 11 illustrated in FIG. 15 has a similar configuration as that of the related line interface unit 11 illustrated in FIG. 6 except that the transmitting port controller 1121, the transmitting port management table 1122, the counter controller 1125, and the transmitted frame counter 1126 are replaced with a transmitting port controller 1141, a transmitting port management table 1142, a counter controller 1145 for transmitting ports, and a transmitted frame counter 1146 equipped for each PMID, respectively.

Figure 16:
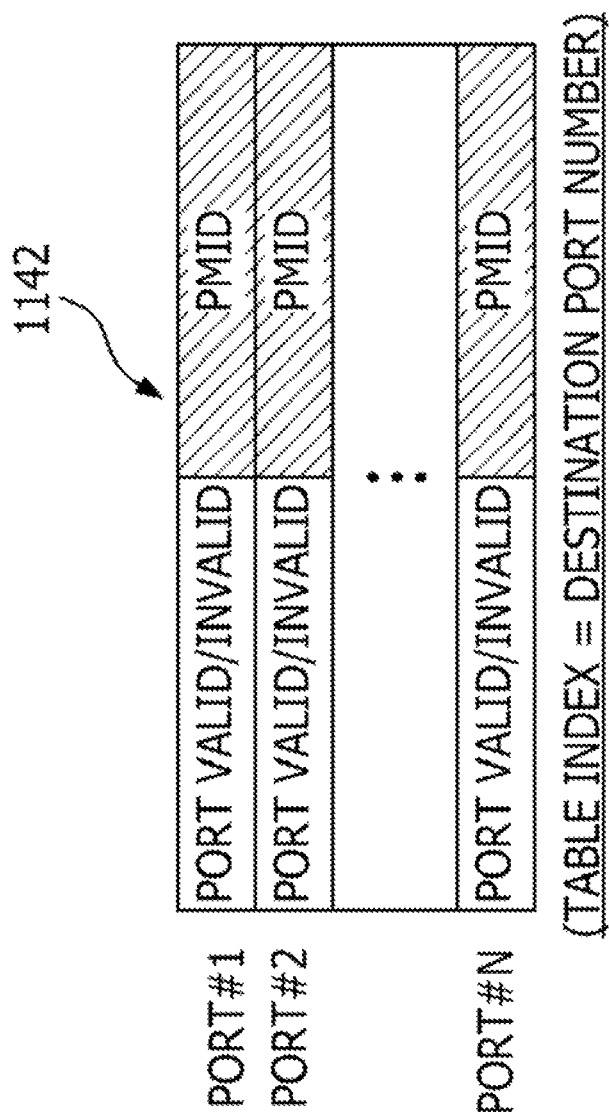
FIG. 16 illustrates a data structure of a transmitting port management table according to the sixth embodiment.

FIG. 16 illustrates a data structure of the transmitting port management table 1142 according to the sixth embodiment. Unlike the related transmitting port management table 1122 illustrated in FIG. 7, a field for setting a PMID for each port is provided in the transmitting port management table 1142.

Operations will now be described with reference back to FIG. 15. Upon receipt of a frame and a destination port number from the transmitted flow controller 1123, the transmitting port controller 1141 uses the received destination port number as an index (or key) to refer to the transmitting port management table 1142, where PMIDs are set. The transmitting port controller 1141 determines whether the corresponding port is valid. If the port is valid, the transmitting port controller 1141 transmits to the counter controller 1145 a trigger signal and the corresponding PMID for incrementing the transmitted frame counter 1146 for the corresponding PMID by one.

The counter controller 1145 controls access to the transmitted frame counter 1146. Upon receipt of the trigger signal from the transmitting port controller 1141, the counter controller 1145 reads from the transmitted frame counter 1146 a value corresponding to the PMID that is received together with the trigger signal, adds one to the read value, and writes the resulting value to the transmitted frame counter 1146. Thus, a counter segment corresponding to the PMID is incremented by one. For example, when a four-port LAG that combines port #1 to port #4 is created, the same PMID value, such as PMID=1, is set in PMID fields corresponding to port #1 to port #4 in the transmitting port controller 1141. Thus, in the transmitted frame counter 1146, transmitted frames to be transmitted from port #1 to port #4, which are aggregated into the same LAG, are recorded in a counter segment having the same PMID=1 as an index. The other operations are similar as those described with reference to FIG. 6.

As described above, a PMID for collecting statistical information can be set for each port. Therefore, collection of statistical information for each aggregate port which combines a plurality of ports can be accomplished by hardware. It is thus possible to reduce the load of the CPU of the controller 1101 and reduce the use of the working memory 1102. In the example of the LAG described above, the controller 1101 does not have to calculate the total number of transmitted frames for port #1 to port #4. Instead, the number of transmitted frames can be collected for each LAG by reading a counter value corresponding to PMID=1 in the transmitted frame counter 1146.

Seventh Embodiment

Figure 17:
FIG. 17 illustrates a data structure of the transmitting port management table according to the seventh embodiment.

FIG. 17 illustrates a data structure of the transmitting port management table 1142 according to the seventh embodiment. The apparatus configuration is the same as that illustrated in FIG. 15.

Referring to FIG. 17, to allow two PMIDs to be set for each physical port, the transmitting port management table 1142 has two V bit fields and two PMID fields for each port. To allow two or more PMIDs to be set, two or more V bit fields and PMID fields may be provided.

V1 is a V bit for PMID1 and indicates whether PMID1 is valid or not. Specifically, V1=0 indicates that PMID1 is invalid, while V1=1 indicates that PMID1 is valid. Similarly, V2 is a V bit for PMID2 and indicates whether PMID2 is valid or not. Specifically, V2=0 indicates that PMID2 is invalid, while V2=1 indicates that PMID2 is valid.

Referring to FIG. 15, when a V bit is valid, the counter controller 1145 increments the transmitted frame counter 1146 by one on the basis of the corresponding PMID. For example, when both V1 and V2 are valid, the counter controller 1145 receives PMID1 and PMID2, along with receiving a trigger signal twice, from the transmitting port controller 1141. Then, on the basis of the received PMID1 and PMID2, the counter controller 1145 accesses the transmitted frame counter 1146 twice to increment each of counter values corresponding to the respective PMID1 and PMID2 by one. The other operations are the same as those described in the sixth embodiment.

Although V bits are implemented here, it is possible, without using V bits, that a value indicating that a PMID is invalid (e.g., PMID=0) be determined in advance, so as to prevent an invalid PMID from being accessed. In this case, a counter value for PMID=0 in the transmitted frame counter 1146 is a meaningless counter entry that counts the number of invalid transmitted frames for which collection of statistical information is not necessary.

As described above, two or more PMIDs can be set for one physical port. Therefore, when, for example, LAGs are created, it is possible to accommodate a request to collect statistical information for each physical port separately from statistical information for each LAG. When hardware supports collection of statistical information for each port and that for each aggregate port at the same time, it is possible to reduce the CPU load of processing and managing statistical information. Moreover, with implementation of V bits, when it is not necessary to collect statistical information even though ports are operating, it is possible to stop collecting the statistical information. This can reduce unnecessary power consumption of the hardware.

Eighth Embodiment

Figure 18:
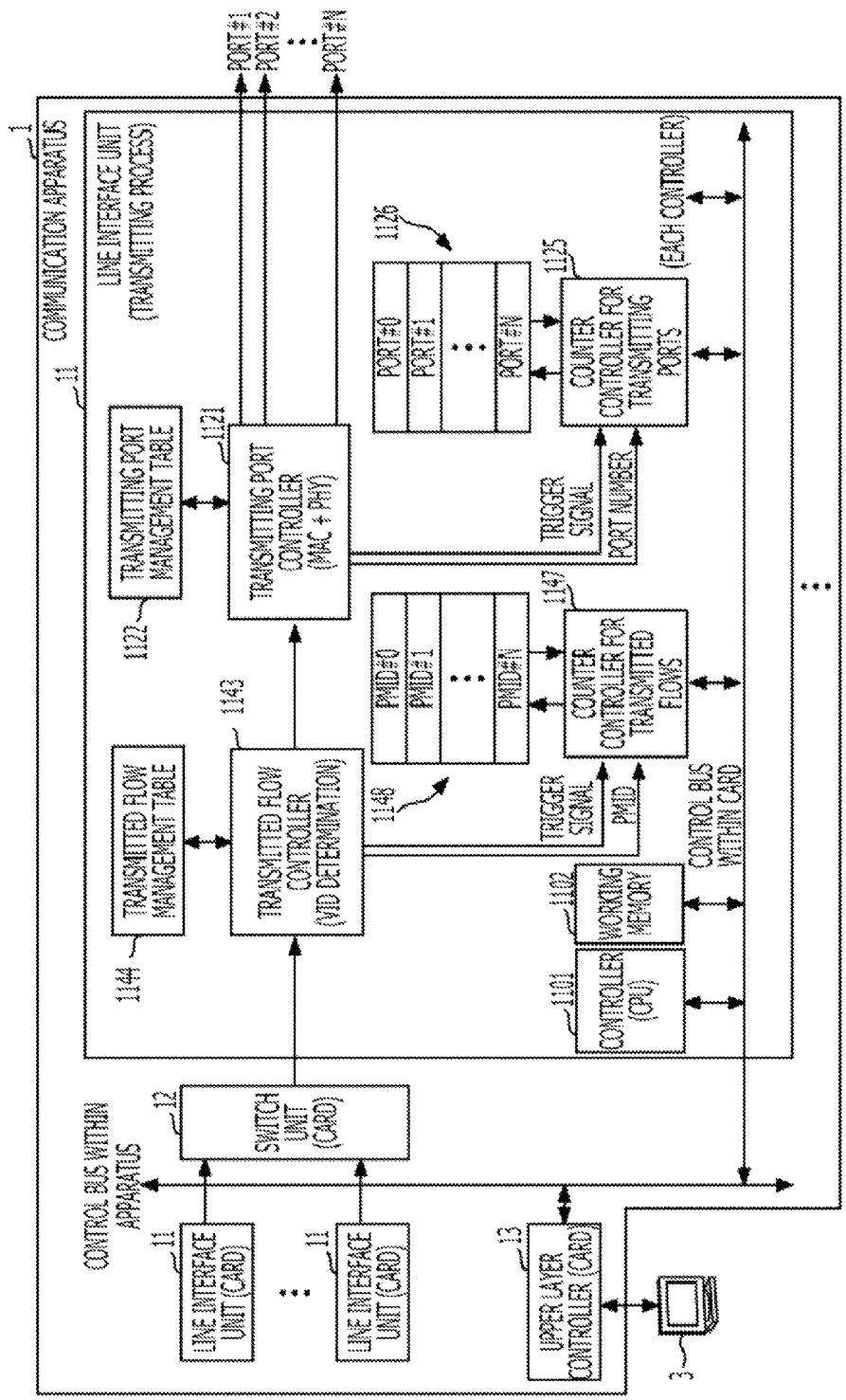
FIG. 18 illustrates a configuration for a transmitting process of a line interface unit in the communication apparatus according to eighth and ninth embodiments.

FIG. 18 illustrates a configuration for a transmitting process of a line interface unit 11 in the communication apparatus 1 according to eighth and ninth embodiments.

The line interface unit 11 illustrated in FIG. 18 has the same configuration as that of the related line interface unit 11 illustrated in FIG. 6 except that the transmitted flow controller 1123, the transmitted flow management table 1124, the counter controller 1127, and the transmitted frame counter 1128 are replaced with a transmitted flow controller 1143, a transmitted flow management table 1144, a counter controller 1147 for transmitted flows, and a transmitted frame counter 1148 equipped for each PMID.

FIG. 19 illustrates a data structure of the transmitted flow management table 1144 according to the eighth embodiment. Unlike the related transmitted flow management table 1124 illustrated in FIG. 7, a field for setting a PMID for each VID is provided in the transmitted flow management table 1144. That is, a PMID can be set for each flow or logical channel.

Operations will now be described with reference back to FIG. 18. When a frame is to be transmitted, the transmitted flow controller 1143 uses a VID as an index (or key) to refer to the transmitted flow management table 1144, where PMIDs are set. The transmitted flow controller 1143 determines whether the corresponding VID is valid. If the VID is valid, the transmitted flow controller 1143 transmits to the counter controller 1147 a trigger signal and the corresponding PMID for incrementing a value of the transmitted frame counter 1148 for the corresponding PMID by one.

The counter controller 1147 controls access to the transmitted frame counter 1148. Upon receipt of the trigger signal from the transmitted flow controller 1143, the counter controller 1147 reads from the transmitted frame counter 1148 a value corresponding to the PMID that is received together with the trigger signal, adds one to the read value, and writes the resulting value to the transmitted frame counter 1148. Thus, a counter segment corresponding to the PMID is incremented by one. The other operations are similar as those described with reference to FIG. 6.

As described above, a PMID for collecting statistical information can be set for each flow. Therefore, collection of statistical information for each aggregate flow which combines a plurality of flows can be accomplished by hardware. For example, in a network service configuration where a plurality of different VID frames are aggregated into one service flow, the different VID frames can be aggregated into one piece of statistical information. It is thus possible to reduce the load of the CPU of the controller 1101 and reduce the use of the working memory 1102.

Ninth Embodiment

Figure 20:
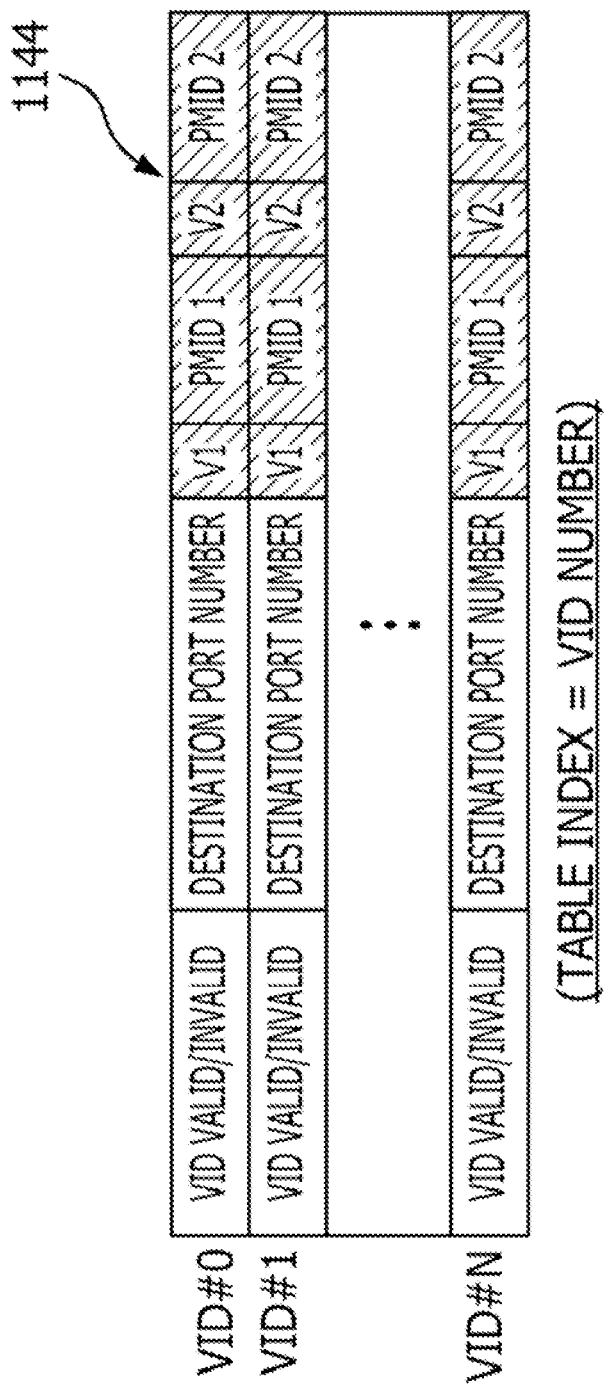
FIG. 20 illustrates a data structure of the transmitted flow management table according to the ninth embodiment.

FIG. 20 illustrates a data structure of the transmitted flow management table 1144 according to the ninth embodiment. The apparatus configuration is the same as that illustrated in FIG. 18.

Referring to FIG. 20, to allow two PMIDs to be set for each flow or logical channel, the transmitted flow management table 1144 has two V bit fields and two PMID fields for each VID. To allow two or more PMIDs to be set, two or more V bit fields and PMID fields may be provided.

V1 is a V bit for PMID1 and indicates whether PMID1 is valid or not. Specifically, V1=0 indicates that PMID1 is invalid, while V1=1 indicates that PMID1 is valid. Similarly, V2 is a V bit for PMID2 and indicates whether PMID2 is valid or not. Specifically, V2=0 indicates that PMID2 is invalid, while V2=1 indicates that PMID2 is valid.

Referring to FIG. 18, when a V bit is valid, the counter controller 1147 increments the transmitted frame counter 1148 by one on the basis of the corresponding PMID. For example, when both V1 and V2 are valid, the counter controller 1147 receives PMID1 and PMID2, along with receiving a trigger signal twice, from the transmitted flow controller 1143. Then, on the basis of the received PMID1 and PMID2, the counter controller 1147 accesses the transmitted frame counter 1148 twice to increment each of counter values corresponding to the respective PMID1 and PMID2 by one. The other operations are the same as those described in the eighth embodiment.

As described above, two or more PMIDs can be set for each VID. Therefore, collection of statistical information for each flow and that for each aggregate flow which combines a plurality of flows can be simultaneously done by hardware. This can reduce the load of the CPU of the controller 1101.

Tenth Embodiment

Figure 21:
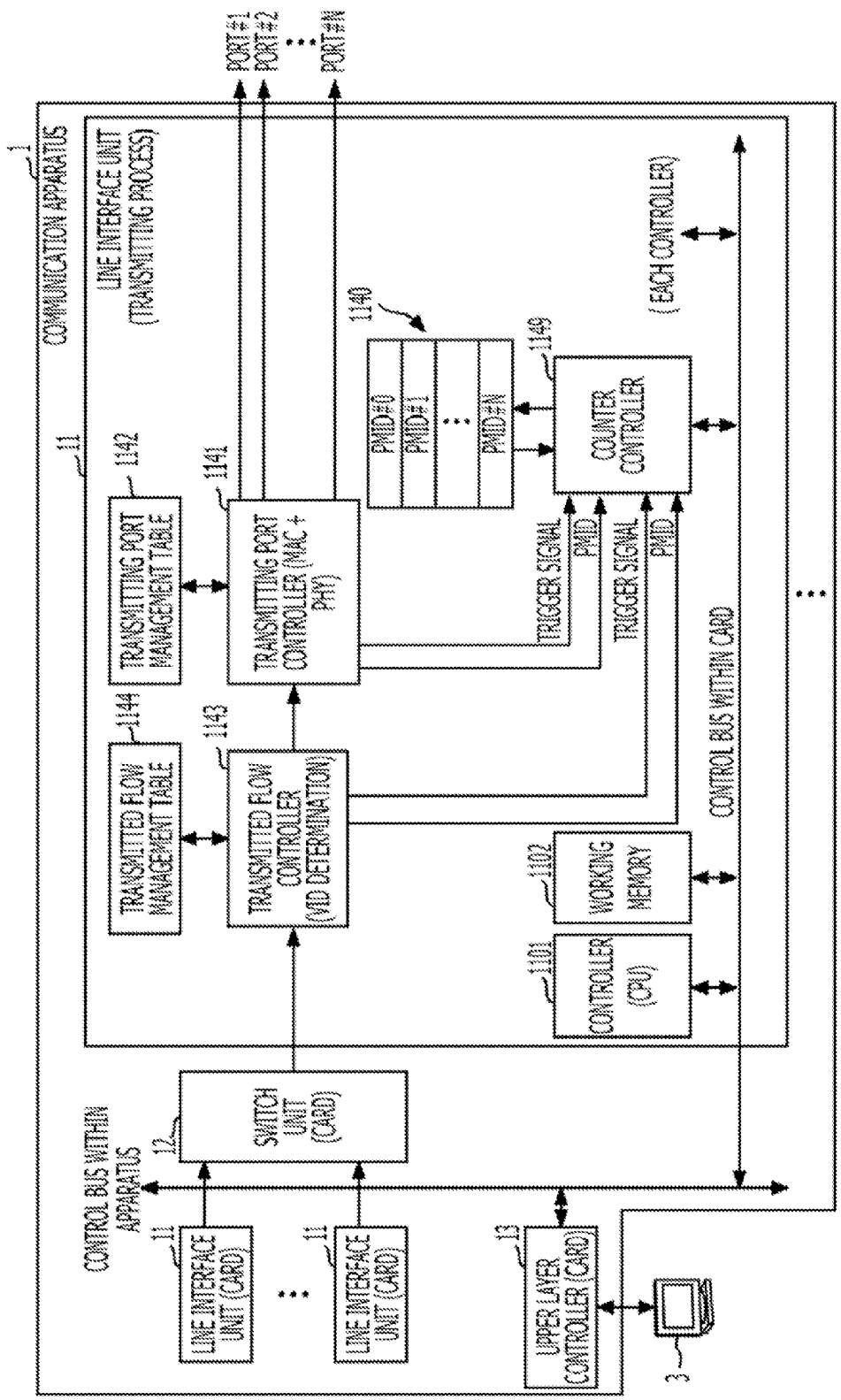
FIG. 21 illustrates a configuration for a transmitting process of a line interface unit in the communication apparatus according to a tenth embodiment.

FIG. 21 illustrates a configuration for a transmitting process of a line interface unit 11 in the communication apparatus 1 according to a tenth embodiment.

The line interface unit 11 illustrated in FIG. 21 has a similar configuration as that of the related line interface unit 11 illustrated in FIG. 6 except that the line interface unit 11 illustrated in FIG. 21 includes the transmitting port controller 1141, the transmitting port management table 1142, the transmitted flow controller 1143, and the transmitted flow management table 1144 instead of the transmitting port controller 1121, the transmitting port management table 1122, the transmitted flow controller 1123, and the transmitted flow management table 1124, respectively. Also, instead of the counter controller 1125, the transmitted frame counter 1126, the counter controller 1127, and the transmitted frame counter 1128 of the related line interface unit 11 illustrated in FIG. 6, the line interface unit 11 illustrated in FIG. 21 includes a counter controller 1149 common to both the transmitting port controller 1141 and the transmitted flow controller 1143, and a transmitted frame counter 1140 equipped for each PMID.

The line interface unit 11 illustrated in FIG. 21 includes the transmitting port management table 1142 illustrated in FIG. 17 and the transmitted flow management table 1144 illustrated in FIG. 20. Alternatively, the line interface unit 11 illustrated in FIG. 21 may include the transmitting port management table 1142 illustrated in FIG. 16 and the transmitted flow management table 1144 illustrated in FIG. 19.

Referring to FIG. 21, the counter controller 1149 receives a trigger signal and a PMID from each of the transmitting port controller 1141 and the transmitted flow controller 1143, resolves a conflict between the transmitting port controller 1141 and the transmitted flow controller 1143, and increments a value of the transmitted frame counter 1140 corresponding to the received PMID by one.

It is thus possible to collect statistical information on a PMID-by-PMID basis for both ports and flows, support collection of statistical information on both individual and aggregate bases, and reduce the CPU load of collecting and managing statistical information in the controller 1101.

Eleventh Embodiment

Figure 22:
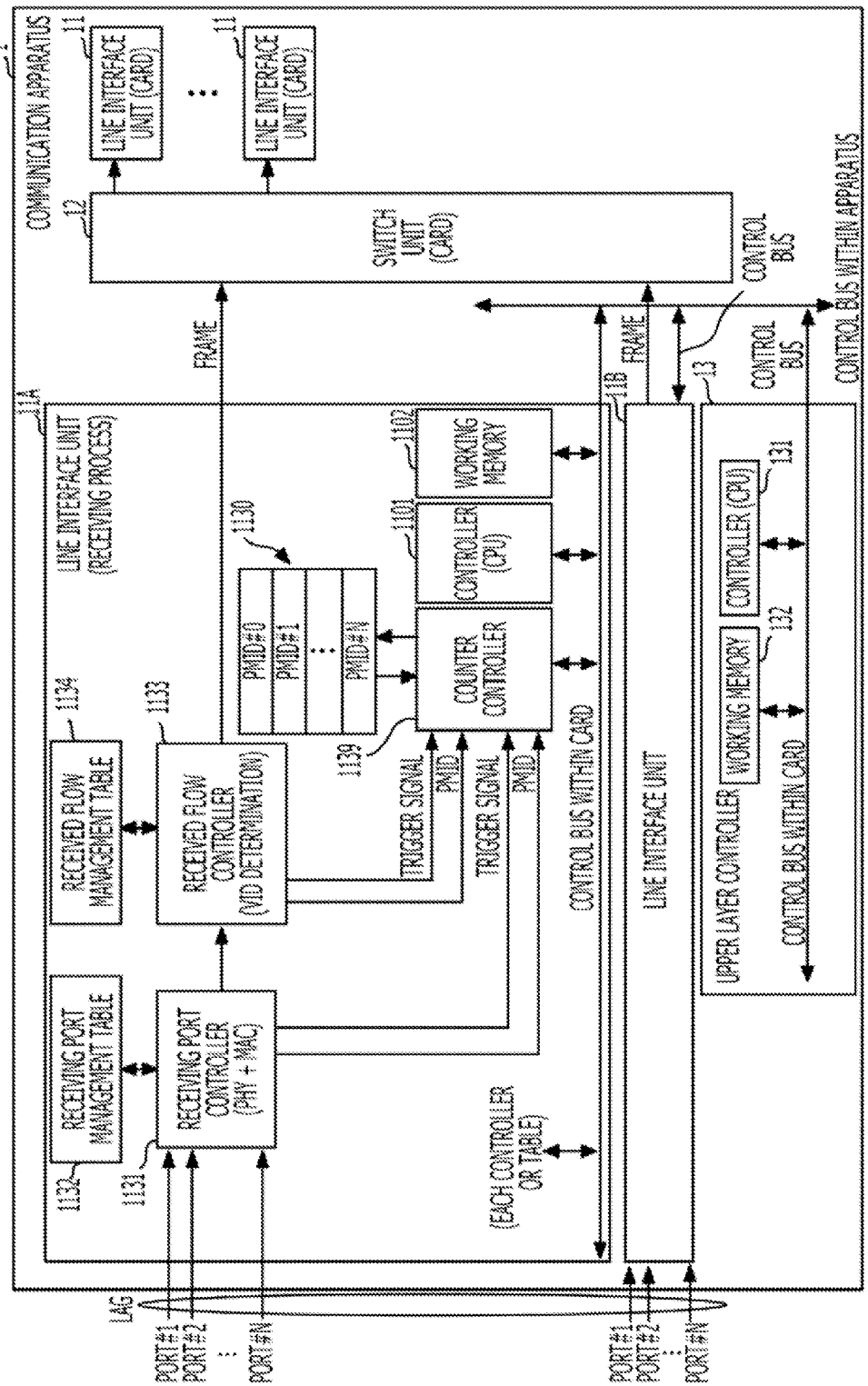
FIG. 22 illustrates a configuration for a receiving process of a line interface unit in the communication apparatus according to an eleventh embodiment.

FIG. 22 illustrates a configuration for a receiving process of a line interface unit 11A in the communication apparatus 1 according to an eleventh embodiment.

FIG. 22 illustrates an example in which a LAG is created across different line interface units 11. That is, a LAG having N×2 ports is created across the line interface unit 11A and a line interface unit 11B. The line interface units 11A and 11B both implement functions described in the fifth embodiment with reference to FIG. 14.

In the related art, to collect the number of received frames for such a LAG created across different cards, it is necessary, after the line interface units 11A and 11B individually collect statistical information for their ports, that a controller 131 included in the upper layer controller 13 read the number of received frames for each port of each card, add all the read numbers together, and store the resulting value in a working memory 132. In this example, the upper layer controller 13 needs to read N×2 pieces of counter information (i.e., needs to read counter information N×2 times) from the line interface units 11A and 11B and add them all.

In the eleventh embodiment, however, when a LAG is created across different cards, a PMID value common to the different cards is set, in the receiving port management table 1132, for all ports included in the LAG. As a result, on the basis of this same PMID value, the receiving port controller 1131 that refers to the receiving port management table 1132 records the number of received frames in the received frame counter 1130 for the LAG created across the different cards.

Thus, from the received frame counter 1130 for each of the line interface units 11A and 11B, the controller 131 in the upper layer controller 13 can read a counter value corresponding to the same PMID value, add the read values together, and write the resulting value to the working memory 132. This means that the controller 131 does not have to read a counter value more than once for each card. Moreover, since the same PMID is set, when a counter value read from each card is to be written to the working memory 132, the read values can be directly written to a working memory area managed on the basis of the PMID. This can reduce the load of the CPU of the controller 131 and ease the management of statistical information.

When a LAG is created across different cards, the processing load of the CPU of the upper layer controller 13 may be further reduced by selecting a primary card in advance, assigning the same PMID value to all ports included in the LAG, and collectively managing statistical information for the LAG on the side of the primary card. For example, when the line interface unit 11A is selected as a primary card, the line interface unit 11A communicates through the controller 1101 with a controller in the line interface unit 11B using a control bus within the apparatus. Then, from a received frame counter equipped for each PMID in the line interface unit 11B, the line interface unit 11A periodically reads the number of received frames for the PMID assigned to the LAG, and adds the read value to a counter value for the PMID in the received frame counter 1130 within the line interface unit 11A.

Thus, for collecting statistical information (e.g., the number of received frames) for each LAG, the controller 131 in the upper layer controller 13 needs to read only the received frame counter 1130 in the line interface unit 11A. This makes it possible to reduce the load of the CPU of the upper layer controller 13.

Although a receiving process has been described with reference to FIG. 22, the same technique is applicable to a transmitting process.

Twelfth Embodiment

Figure 23:
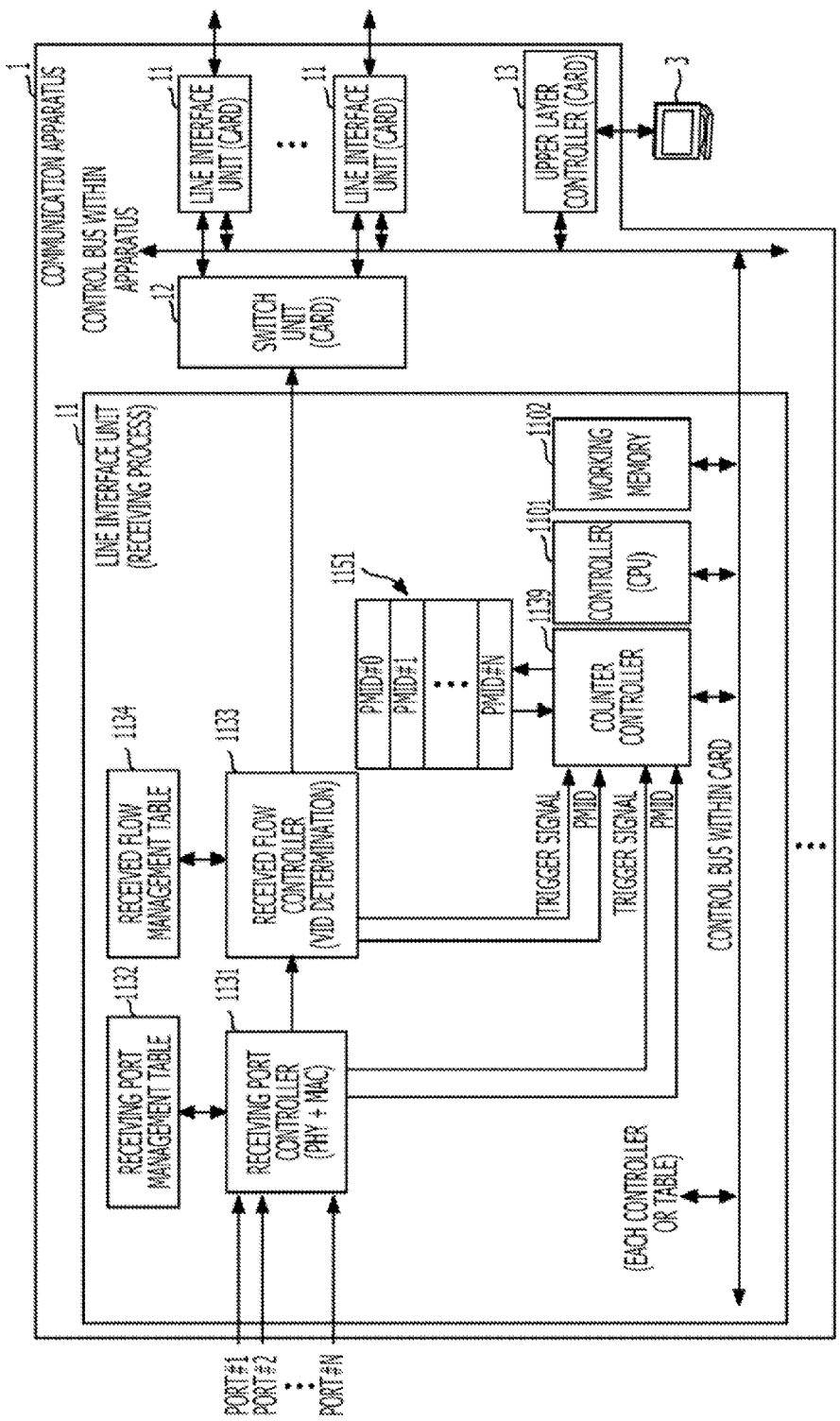
FIG. 23 illustrates a configuration for a receiving process of a line interface unit in the communication apparatus according to a twelfth embodiment.

FIG. 23 illustrates a configuration for a receiving process of a line interface unit 11 in the communication apparatus 1 according to a twelfth embodiment.

In the twelfth embodiment, for frames dropped in the line interface unit 11, a dropped frame counter 1151 equipped for each PMID is capable of counting the number of dropped frames for each PMID.

The line interface unit 11 illustrated in FIG. 23 includes the receiving port management table 1132 illustrated in FIG. 10 and the received flow management table 1134 illustrated in FIG. 13.

Referring to FIG. 23, when the line interface unit 11 receives a frame, the receiving port controller 1131 and the received flow controller 1133 refer to the receiving port management table 1132 and the received flow management table 1134, respectively, to determine whether the corresponding receiving port and VID are valid. If the receiving port is invalid, the receiving port controller 1131 drops the frame and notifies the counter controller 1139 of a trigger signal and a PMID value. Upon receipt of the trigger signal, the counter controller 1139 uses the received PMID as an index (or key) to increment a counter value of the dropped frame counter 1151 for the corresponding PMID by one. If the VID value of the received frame is invalid, the received flow controller 1133 drops the frame and notifies the counter controller 1139 of a trigger signal and a PMID value. Upon receipt of the trigger signal, the counter controller 1139 uses the received PMID as an index to increment a counter value of the dropped frame counter 1151 for the corresponding PMID by one.

Although a receiving process has been described with reference to FIG. 23, the same technique is applicable to a transmitting process. Additionally, the functions of collecting the number of received frames and the number of transmitted frames for each PMID described in the fifth embodiment (see FIG. 14) and the tenth embodiment (see FIG. 21), respectively, may be performed at substantially the same time.

Thus, as in the cases of the number of received frames and the number of transmitted frames, the number of dropped frames can be collected for each PMID. When a plurality of PMIDs can be set in each management table, the number of dropped frames can be collected for each port and each aggregate port, or for each flow and each aggregate flow. With the same PMID, the number of received frames, the number of transmitted frames, and the number of dropped frames can be collected on the basis of this PMID.

Thirteenth Embodiment

Figure 24:
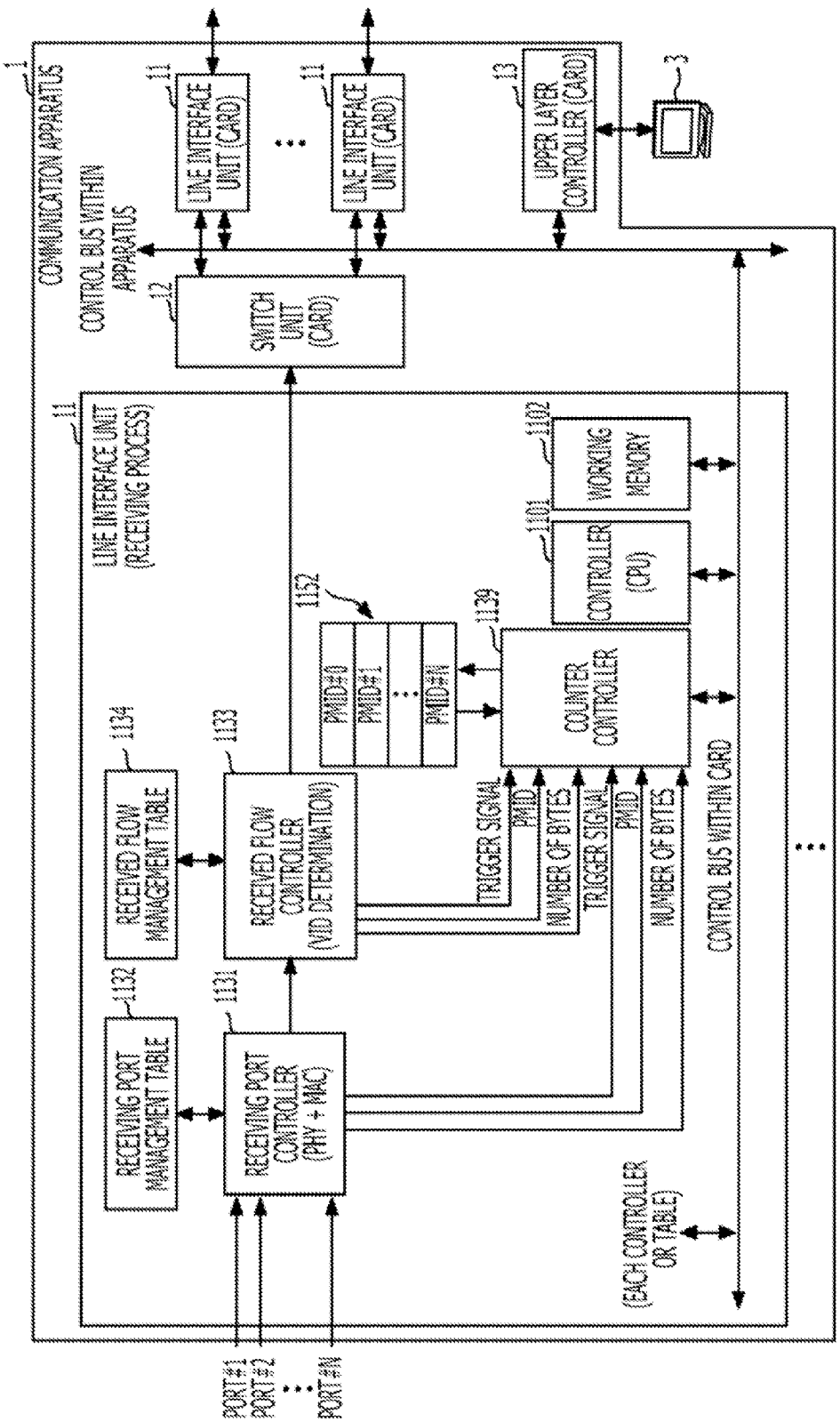
FIG. 24 illustrates a configuration for a receiving process of a line interface unit in the communication apparatus according to a thirteenth embodiment.

FIG. 24 illustrates a configuration for a receiving process of a line interface unit 11 in the communication apparatus 1 according to a thirteenth embodiment.

In the thirteenth embodiment, for frames received in the line interface unit 11, a received byte counter 1152 equipped for each PMID is capable of counting the number of received bytes for each PMID. The number of received bytes is the byte length of a received frame. When a frame is received, the byte length of the frame is measured (detected) and the number of bytes is added, so that statistical information (e.g., the number of received bytes) is collected. Even when the frame length is, for example, 1000 bytes or 100 bytes, the number of frames is counted as 1. However, by counting the number of bytes, the byte length of the frame can be measured (detected). Therefore, the amount of data can be collected as statistical information. In this case, as statistical information, a communication apparatus collects the number of transmitted and received bytes, as well as the number of transmitted and received frames and the number of dropped frames.

The line interface unit 11 illustrated in FIG. 24 includes the receiving port management table 1132 illustrated in FIG. 10 and the received flow management table 1134 illustrated in FIG. 13.

The receiving port controller 1131 and the received flow controller 1133 illustrated in FIG. 24 each have an additional function of measuring (detecting) the number of bytes of a received frame, and output the number of bytes together with a PMID. The function of measuring the number of bytes of a received frame may be added only to the receiving port controller 1131, and the received flow controller 1133 may use the result of the measurement. Alternatively, the function of measuring the number of bytes of a received frame may be provided separately from both the receiving port controller 1131 and the received flow controller 1133, and the receiving port controller 1131 and the received flow controller 1133 may use the result of the measurement.

Referring to FIG. 24, when the line interface unit 11 receives a frame, the receiving port controller 1131 and the received flow controller 1133 refer to the receiving port management table 1132 and the received flow management table 1134, respectively, to determine whether the corresponding receiving port and VID are valid. If the receiving port is valid, the receiving port controller 1131 notifies the counter controller 1139 of a trigger signal, a PMID value, and the number of bytes. Upon receipt of the trigger signal, the counter controller 1139 uses the received PMID as an index to add the number of bytes to a counter value of the received byte counter 1152. If the VID value of the received frame is valid, the received flow controller 1133 notifies the counter controller 1139 of a trigger signal, a PMID value, and the number of bytes. Upon receipt of the trigger signal, the counter controller 1139 uses the received PMID as an index to add the number of bytes to a counter value of the received byte counter 1152.

Although a receiving process has been described with reference to FIG. 24, the same technique is applicable to a transmitting process. Additionally, the functions of collecting the number of received frames and the number of transmitted frames for each PMID described in the fifth embodiment (see FIG. 14) and the tenth embodiment (see FIG. 21), respectively, may be performed at substantially the same time. In addition to these functions, the function of collecting the number of dropped frames for each PMID described in the twelfth embodiment (see FIG. 23) may also be performed at substantially the same time.

Thus, as in the cases of the number of received frames, the number of transmitted frames, and the number of dropped frames, the number of received and transmitted bytes can be collected for each PMID. When a plurality of PMIDs can be set in each management table, the number of bytes can be collected for each port and each aggregate port, or for each flow and each aggregate flow. With the same PMID, the number of received frames, the number of transmitted frames, the number of dropped frames, and the number of bytes can be collected on the basis of this PMID.

Fourteenth Embodiment

The collection of statistical information (e.g., the number of received frames) for each PMID described in the fifth embodiment (see FIG. 14) and the collection of statistical information (e.g., the number of transmitted frames) for each PMID described in the tenth embodiment (see FIG. 21) are implemented in the same interface (IF) card in practice. PMIDs for transmitting and receiving sides are independent of each other and may be given different values.

In a fourteenth embodiment, in one line interface unit 11 having a statistical information collecting function in which operations on receiving and transmitting sides are performed on the basis of PMIDs that are independent of each other, the PMIDs for the receiving and transmitting sides are given the same value for the same port or the same flow. This makes it possible to manage the number of received frames and the number of transmitted frames for the same port or the same flow. Thus, a software program for the controller 1101 can consistently use one PMID to manage and control the number of received frames and the number of transmitted frames for the same port or the same flow.

Fifteenth Embodiment

In a fifteenth embodiment, when frames having invalid VID values are received and to be dropped, statistical information (e.g., the number of dropped frames) is collected at a time.

Figure 5:
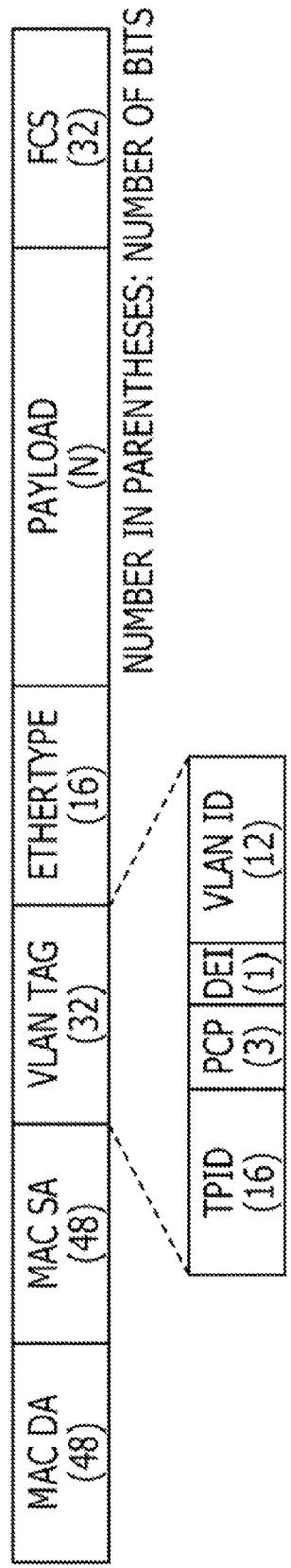
FIG. 5 illustrates an Ethernet® frame format with a VLAN tag.

As illustrated in FIG. 5, a VID (or VLAN ID) in an Ethernet® frame format with a VLAN tag is composed of 12 bits, which allow use of 4096 VIDs. However, some communication apparatuses may not be able to use all the 4096 VIDs due to limitations in their hardware or processing capability. For example, some apparatuses may allow registration of up to any 128 VIDs and accept frames having registered VIDs into the apparatuses as valid frames, but may request that frames having unregistered VIDs be dropped as invalid frames. Some apparatus specifications may require that regardless of VID values, the number of frames to be dropped due to their invalid VIDs be collected at a time.

In such cases, in the fourth embodiment (see FIG. 11) and the fifth embodiment (see FIG. 14) described above, although the number of entries in the received flow management table 1134 illustrated in FIG. 13 is 4096 (e.g., the value of N in VID #N is 4095) and up to 128 entries are set to "VID valid", frames having invalid VIDs are dropped. The number of dropped frames having invalid VIDs can be collected at a time by setting "invalid" entries as follows: V1=1 (valid), PMID1=specific value for invalid VID, V2=0 (invalid), and PMID2=invalid (not referred to because V2=0). At the same time, the received frame counter 1130 has 129 entries, and the 129th entry is used to store the number of dropped frames. Thus, by implementing the received frame counter 1130 having X entries, where X is a value obtained by adding one to the number of valid VIDs that can be accommodated in a line IF card, it is possible to collect both the number of received frames and the number of dropped frames and to reduce the size of the counter.

Figure 25:
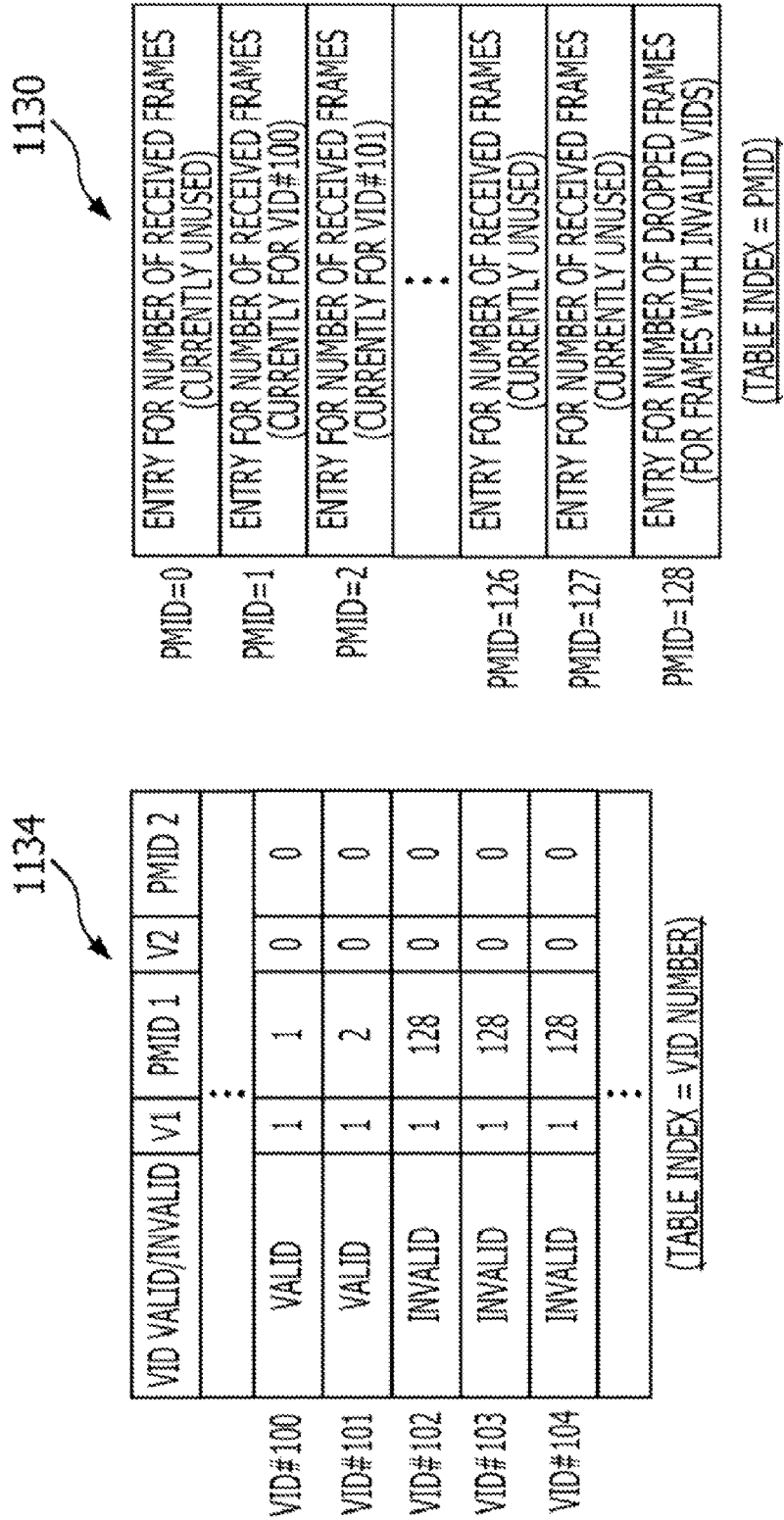
FIG. 25 illustrates data structures of the received flow management table and a received frame counter equipped for each performance monitoring identifier (PMID) according to a fifteenth embodiment.

FIG. 25 illustrates data structures of the received flow management table 1134 and the received frame counter 1130 according to the fifteenth embodiment.

In the received flow management table 1134 illustrated in FIG. 25, VID #100 is registered as a valid VID, and V1=1 and PMID1=1 are set so that the number of received frames is collected for PMID #1. Additionally, V2=0 (invalid) is set to indicate that it is not necessary to collect statistical information for each aggregate port. VID #101 is also registered as a valid VID, and V1=1 and PMID1=2 are set so that the number of received frames is collected for PMID #2. VID #102 to VID #104 are indicated as invalid VIDs and their corresponding frames are dropped inside the line interface unit 11. V1=1 and PMID1=128 are set so that the number of these dropped frames is collected for PMID #128.

In this example, the received frame counter 1130 has a total of 129 entries. In the 129th entry for PMID=128, only the number of frames to be dropped because their VIDs are determined to be invalid is counted. That is, the entry for PMID=128 is for the number of frames to be dropped because of their invalid VIDs.

Thus, in the fifteenth embodiment, since the number of frames to be dropped as invalid flows is collected using the same PMID, the received frame counter 1130 can count the number of dropped frames. For the received frame counter 1130, it is only necessary to have X entries, where X is a value obtained by adding one to the number of valid flows that can be accommodated in a line IF card. It is thus possible to reduce the size of the counter.

Sixteenth Embodiment

In the thirteenth embodiment described above, the received byte counter 1152 illustrated in FIG. 24 collects statistical information (e.g., the number of received bytes). Adding the received frame counter 1130 (see FIG. 14) described in the fifth embodiment to the line interface unit 11 of the thirteenth embodiment makes it possible to collect additional statistical information (e.g., the number of received frames) within the same card. However, this requires memory for the received frame counter 1130 as well as that for the received byte counter 1152. Moreover, when a frame is received, writing to the received frame counter 1130 and writing to the received byte counter 1152 are done separately. This increases complexity of hardware processing in a counter controller, increases processing load, and increases power consumption.

Accordingly, in a sixteenth embodiment, the received byte counter 1152 illustrated in FIG. 24 is replaced with a received frame and received byte counter 1153 equipped for each PMID, so that the number of frames and the number of bytes are simultaneously written to the counter. This means that the apparatus configuration of the sixteenth embodiment can be realized by replacing the received byte counter 1152 illustrated in FIG. 24 with the received frame and received byte counter 1153.

The timing diagram of FIG. 26A illustrates the timing of transmission of a trigger signal, a PMID, and the number of bytes from the receiving port controller 1131 to the counter controller 1139, and the timing of transmission of a trigger signal, a PMID, and the number of bytes from the received flow controller 1133 to the counter controller 1139. The counter controller 1139 captures data (e.g., a PMID and the number of bytes) in synchronization with rising edges of a trigger signal.

Figure 26B:
FIG. 26B illustrates a configuration of a received byte counter according to an embodiment.

FIG. 26B illustrates a configuration of the received byte counter 1152 illustrated in FIG. 24. Here, a counter segment for each PMID has 64-bit width memory. FIG. 26C illustrates a configuration of the received frame and received byte counter 1153 according to the sixteenth embodiment. Here, 64-bit width memory of each counter segment is divided into two regions: a higher-order 16-bit-width region assigned to the number of received frames, and the remaining lower-order 48-bit-width region assigned to the number of received bytes.

Upon receipt of a trigger signal, the counter controller 1139 reads information for the corresponding PMID from the received frame and received byte counter 1153, increments the higher-order 16-bit-width region assigned to the number of received frames by one, increments the lower-order 48-bit-width region assigned to the number of received bytes by the number of bytes of the received frame, and writes the resulting values to the counter segment for the corresponding PMID in the received frame and received byte counter 1153. Thus, statistical information (e.g., the number of received frames and the number of received bytes) can be collected by one reading process and one writing process. This can reduce the load of memory access processing of hardware and reduce power consumption. Additionally, when the upper layer controller 13 collects statistical information for each line interface unit 11, statistical information (e.g., the number of received frames and the number of received bytes) can be collected by one reading process. It is thus possible to reduce processing load of a controller including a CPU.

Although a receiving process has been described with reference to FIG. 26A to FIG. 26C, the same technique is applicable to a transmitting process.

Overview

As described above, according to the present embodiments, in collection of statistical information for physical ports and logical flows within a communication apparatus, a plurality of PMIDs serving as identifiers designed specifically for collection of statistical information are newly introduced, so that statistical information for physical ports and logical flows is collected for each PMID. It is thus possible to realize, by hardware control, the collection of statistical information not only for individual physical ports and individual logical flows, but also for aggregate ports and aggregate flows, the aggregate ports each combining a plurality of physical ports, the aggregate flows each combining a plurality of logical flows. It is also possible to reduce the CPU processing load associated with the collection of statistical information, provide various kinds of statistical information for each port and each flow in the communication apparatus, and significantly contribute to improved reliability of the communication network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus comprising:
a table configured to include a correspondence between at least one of a first identifier that identifies a port from which frames are received, a second identifier that identifies a port from which frames are transmitted, a third identifier that identifies a flow related to a frame received, and a fourth identifier that identifies a flow related to a frame to be transmitted, and a fifth identifier that identifies collecting statistical information;
a counter equipped for each fifth identifier; and
a controller configured to search the table, each time a frame is received or transmitted, for a fifth identifier by using any one of the first to fourth identifiers related to the frame as a key, and increment a counter corresponding to the fifth identifier by an amount.

2. The communication apparatus according to claim 1, wherein the amount is one, a value related to a length of the received frame, or a value related to a length of the transmitted frame.

3. The communication apparatus according to claim 1, wherein in the table, a single fifth identifier corresponds to a plurality of first identifiers, a plurality of second identifiers, a plurality of third identifiers, or a plurality of fourth identifiers.

4. The communication apparatus according to claim 1, wherein
the first identifier and the second identifier are identifiers that identify physical ports coupled to a network; and
the third identifier and the fourth identifier are virtual local area network IDs.

5. The communication apparatus according to claim 1, wherein
when the table includes the first identifier or the second identifier, the table further includes, for each port, a sixth identifier that indicates whether the port is valid;
when the table includes the third identifier or the fourth identifier, the table further includes, for each flow, a seventh identifier that indicates whether the flow is valid; and
each time a frame corresponding to any one of the first to fourth identifiers included in the table is received or transmitted, the controller refers to the table and, when the sixth or seventh identifier indicates that the port or flow is invalid, increments a counter for the corresponding fifth identifier by a certain amount.

6. The communication apparatus according to claim 1, wherein the table, the counter, and the controller are provided in each of a plurality of cards; and at least a single fifth identifier is common to the tables in the plurality of cards.

7. A method for controlling a communication apparatus, the method comprising:

receiving or transmitting at least one frame;

referencing a table configured to include a correspondence between at least one of a first identifier that identifies a port from which frames are received, a second identifier that identifies a port from which frames are transmitted, a third identifier that identifies a flow related to a frame received, and a fourth identifier that identifies a flow related to a frame to be transmitted, and a fifth identifier that identifies collecting statistical information; and incrementing a counter by a certain amount each time a frame is received or transmitted, the counter being equipped for each identifier that is associated with a port related to the frame, a flow related to the frame, or a fifth identifier related to the frame.

* * * * *